April 29, 1952     H. S. DAVIS     2,594,739
AUTOMATIC SPEED-SIGNALING AND SPEED-CONTROLLING
SYSTEM FOR AUTOMOBILES AND OTHER VEHICLES
Filed Jan. 31, 1951     8 Sheets-Sheet 1
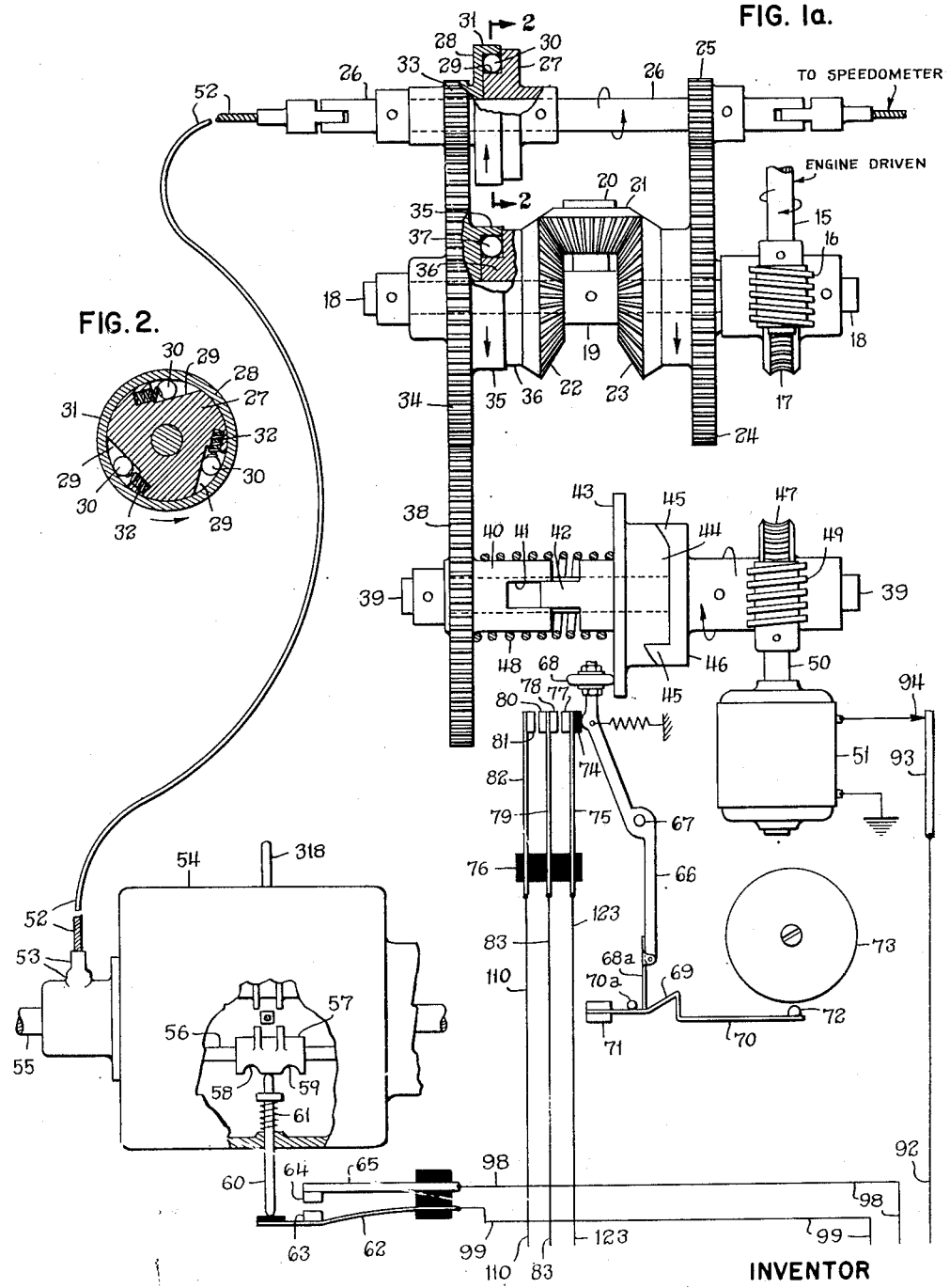
INVENTOR
HENRY SPICER DAVIS
BY Earle Stewart
ATTORNEYS

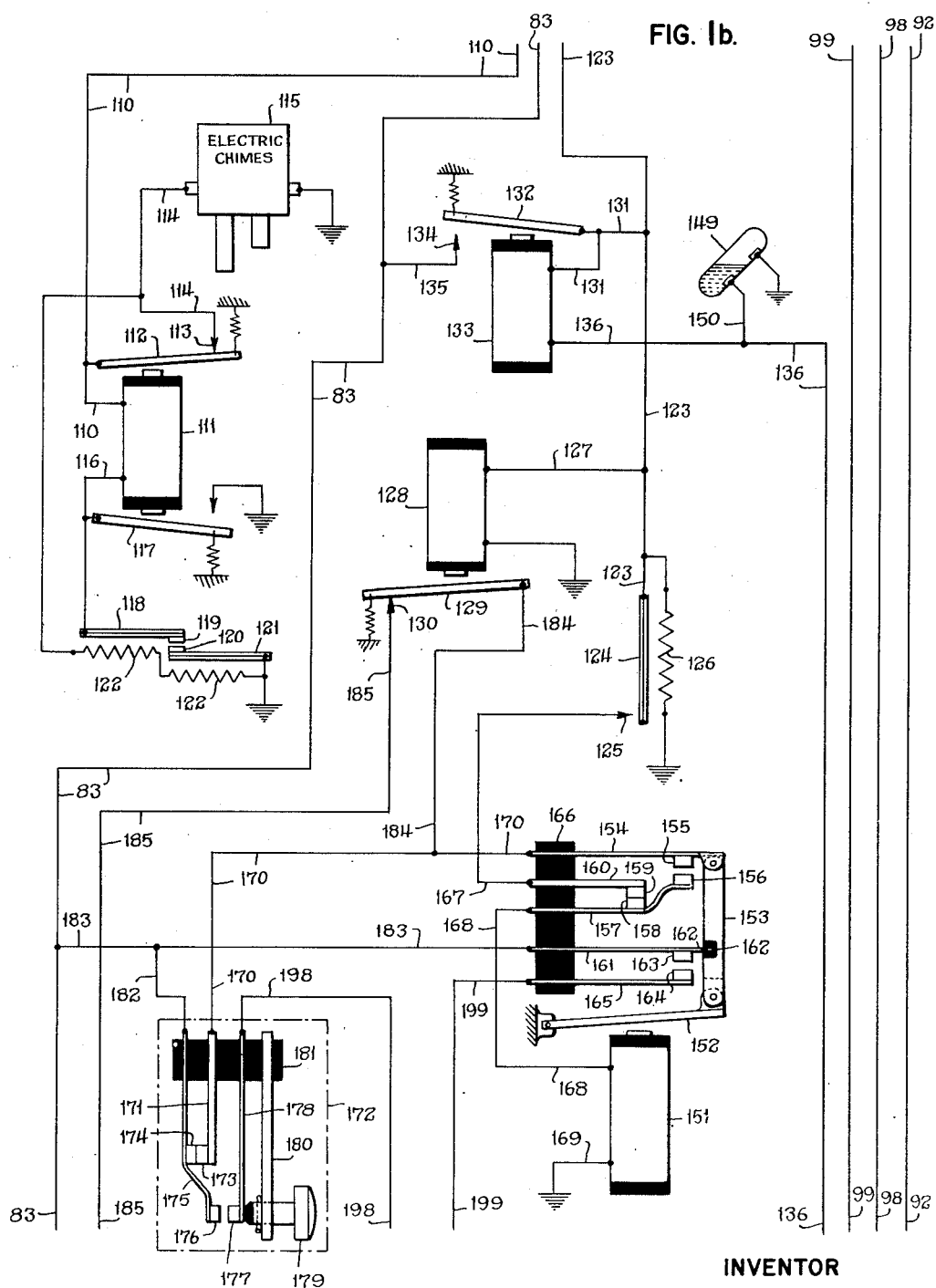

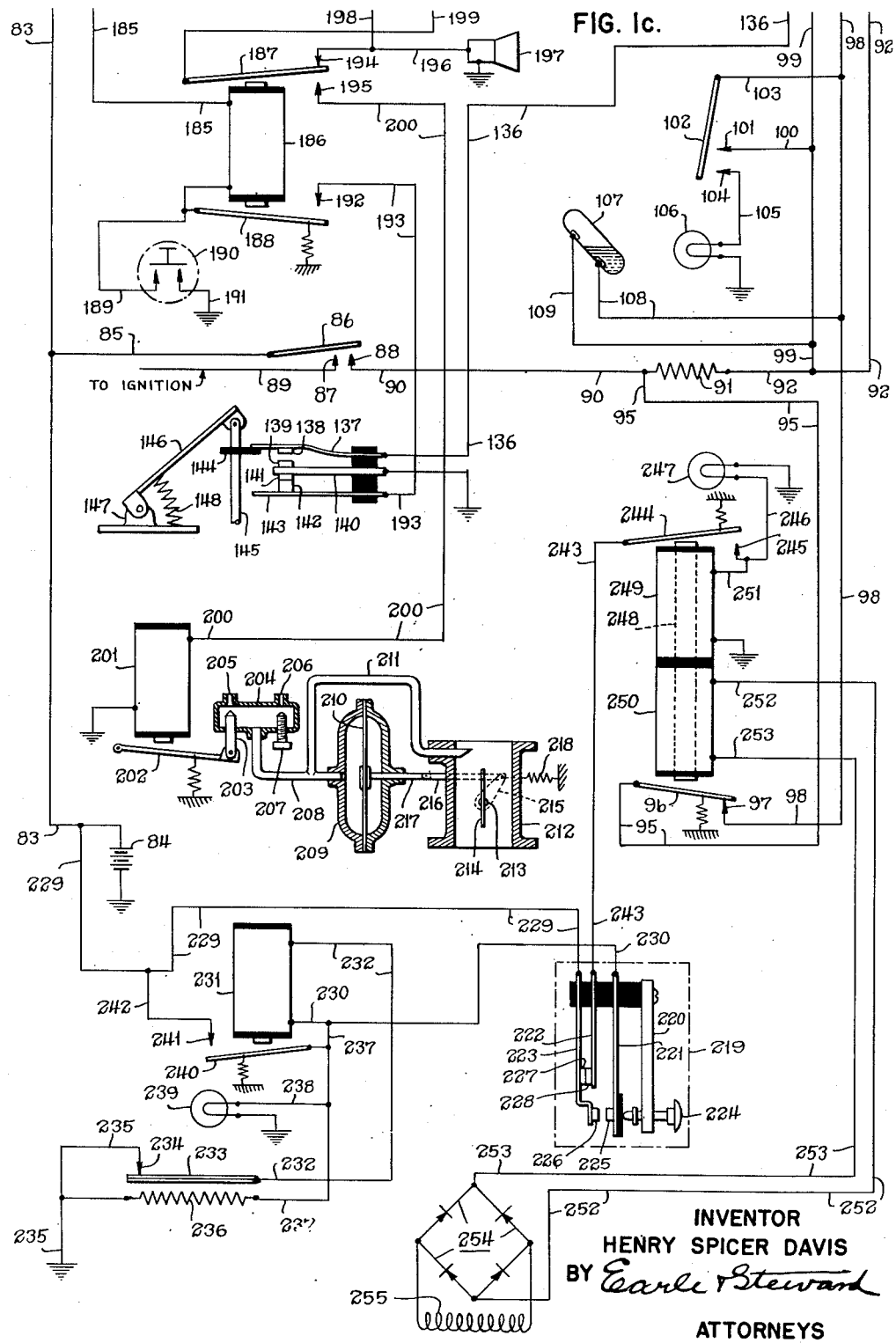

INVENTOR
HENRY SPICER DAVIS
BY *Earle Steward*
ATTORNEYS

FIG. 6.

| VEHICLE SPEED M.P.H. | ENGINE R.P.M. 1st GEAR | ENGINE R.P.M. 2nd GEAR | ENGINE R.P.M. DIRECT DRIVE | MAXIMUM ENGINE R.P.M. WITHOUT GIVING SIGNAL | ENGINE-DRIVEN SHAFT 18 R.P.M. | | VEHICLE-DRIVEN GEAR 23 R.P.M. | DRIVEN GEAR (22 or 22a) R.P.M. |
|---|---|---|---|---|---|---|---|---|
| 0 | | | | | | | | |
| 5 | 750 | 500 | | 1125 | 56.25 | " | 0 | 112.5 |
| 10 | 1500 | 1000 | 500 | 1250 | 62.5 | " | 12.5 | 112.5 |
| 15 | 2250 | 1500 | 750 | 1375 | 68.75 | " | 25 | 112.5 |
| 20 | 3000 | 2000 | 1000 | 1500 | 75 | " | 37.5 | 112.5 |
| 25 | 3750 | 2500 | 1250 | 1625 | 81.25 | " | 50 | 112.5 |
| 30 | 4500 | 3000 | 1500 | 1750 | 87.5 | " | 62.5 | 112.5 |
| 35 | | 3500 | 1750 | 1875 | 93.75 | " | 75 | 112.5 |
| 40 | | 4000 | 2000 | 2125 | 106.25 | " | 100 | 112.5 |
| 45 | | 4500 | 2250 | 2250 | 112.5 | " | 112.5 | 112.5 |
| 50 | | | 2500 | " | 125 | | 125 | 125 |
| 55 | | | 2750 | " | 137.5 | | 137.5 | 137.5 |
| 60 | | | 3000 | " | 150 | | 150 | 150 |
| 65 | | | 3250 | " | 162.5 | | 162.5 | 162.5 |
| 70 | | | 3500 | " | 175 | | 175 | 175 |

INVENTOR
HENRY SPICER DAVIS
BY Earle Steward
ATTORNEYS

FIG. 7.

| VEHICLE SPEED M.P.H. | ENGINE R.P.M. 1st GEAR | ENGINE R.P.M. 2nd GEAR | ENGINE R.P.M. DIRECT DRIVE | MAXIMUM ENGINE R.P.M. WITHOUT GIVING SIGNAL | ENGINE DRIVEN SHAFT 18 R.P.M | VEHICLE DRIVEN GEAR 23 R.P.M. | DRIVEN GEAR (22 or 22a) R.P.M. |
|---|---|---|---|---|---|---|---|
| 0 | | | | | 75 | 0 | 150 |
| 5 | 750 | 500 | 500 | 1500 " | 81.25 | 12.5 | 150 |
| 10 | 1500 | 1000 | 750 | 1625 " | 87.5 | 25 | 150 |
| 15 | 2250 | 1500 | 1000 | 1750 " | 93.75 | 37.5 | 150 |
| 20 | 3000 | 2000 | 1250 | 1875 " | 100 | 50 | 150 |
| 25 | 3750 | 2500 | 1500 | 2000 " | 106.25 | 62.5 | 150 |
| 30 | 4500 | 3000 | 2000 | 2125 " | 112.5 | 75 | 150 |
| 40 | | 4000 | 2250 | 2250 " | 125 | 100 | 150 |
| 45 | | 4500 | 2500 | 2500 " | 131.25 | 112.5 | 150 |
| 50 | | | 2750 | 2625 " | 137.5 | 125 | 150 |
| 55 | | | 3000 | 2750 " | 143.75 | 137.5 | 150 |
| 60 | | | 3250 | 2875 " | 150 | 150 | 150 |
| 65 | | | 3500 | 3000 " | 162.5 | 162.5 | 162.5 |
| 70 | | | | " | 175 | 175 | 175 |

April 29, 1952  H. S. DAVIS  2,594,739
AUTOMATIC SPEED-SIGNALING AND SPEED-CONTROLLING
SYSTEM FOR AUTOMOBILES AND OTHER VEHICLES
Filed Jan. 31, 1951  8 Sheets-Sheet 7

INVENTOR
HENRY SPICER DAVIS
BY Earle & Steward
ATTORNEYS

INVENTOR
HENRY SPICER DAVIS
BY Earle Steward
ATTORNEYS

Patented Apr. 29, 1952

2,594,739

UNITED STATES PATENT OFFICE 2,594,739

AUTOMATIC SPEED-SIGNALING AND SPEED-CONTROLLING SYSTEM FOR AUTOMOBILES AND OTHER VEHICLES

Henry Spicer Davis, East Orange, N. J.

Application January 31, 1951, Serial No. 208,706

31 Claims. (Cl. 177—311.5)

The present invention relates to improvements in speed systems for automobiles and other vehicles and relates more particularly to automatic speed-signaling and speed-controlling systems for automobiles and other vehicles.

One of the objects of the present invention is to provide a superior system of the character referred to wherein the signal given is determined by a predetermined relationship between the speed of the vehicle and the speed of its driving engine.

Another object of the present invention is to provide a superior automatic signaling system having its components so constructed and arranged that an intermittent signal is given mainly in response to changes in engine speed modified, however, by the then-existing vehicle speed.

A further object of the present invention is to provide a superior automatic system of the character referred to whereby an intermittent signal may be given, which signal increases from a relatively-low frequency to a relatively-high frequency within a relatively-small speed-range as the speed of the vehicle is increased above a predetermined rate of speed.

A still further object of the present invention is to provide a superior automatic system of the character referred to whereby an intermittent signal may be given, which signal increases from a relatively-low frequency to a relatively-high frequency within a relatively-small speed-range as the speed of the engine is increased above a predetermined rate of speed.

Still another object of the present invention is to provide a superior automatic speed-signaling system having its components so constructed and arranged as to provide an initial signal followed by a second and more-arresting signal after the lapse of a predetermined time-interval from the start of this said initial signal.

Another object of the present invention is to provide a superior automatic signaling system of the general character referred to and wherein means is provided whereby the starting of the giving of a signal may be caused to occur at selected different vehicle speeds.

A still further object of the present invention is to provide a superior automatic signaling system wherein means is provided to automatically effect an alteration in the vehicle speed at which a signal will be caused to occur.

Other objects and advantages will appear to those skilled in the art from the following, considered in conjunction with the accompanying drawings.

In the accompanying drawings, in which certain modes of carrying out the present invention are shown for illustrative purposes:

Figs. 1a, 1b and 1c together constitute a schematic and diagrammatic illustration of one form which a speed-alarm system may assume in accordance with the present invention;

Fig. 2 is a detail sectional view taken on the line 2—2 of Fig. 1a;

Fig. 6 is a chart illustrating the speed-relationships between various features of the apparatus when the constant-speed drive-means is functioning at the lower of its two substantially-constant speeds;

Fig. 7 is a chart similar to that shown in Fig. 6 but showing the speed relationships when the constant-speed drive-means is functioning at the upper of its two substantially-constant speeds;

Fig. 8 is a schematic view similar to Fig. 1a but showing another form of mechanism which may be substituted for that of Fig. 1a;

Figure 5:
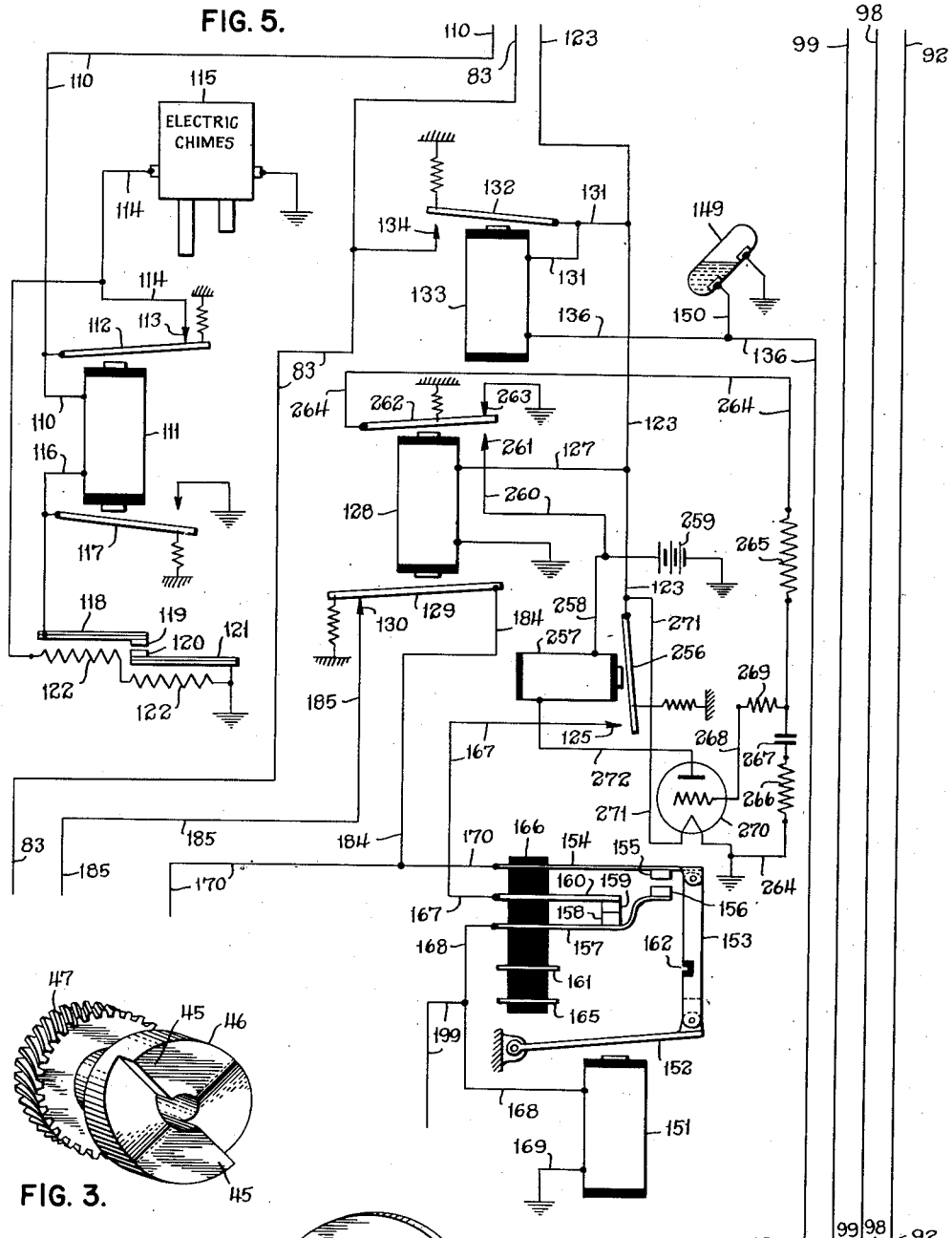
Fig. 5 is a schematic view similar to but less comprehensive than Fig. 1b and showing an electronic form of time-delay control which may be employed in lieu of the bimetallic time-delay control shown in the right central portion of Fig. 1b.
Figure 3:
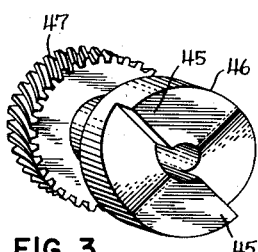
Figs. 3 and 4 are respectively perspective views of the two complemental cam-heads.
Figure 4:
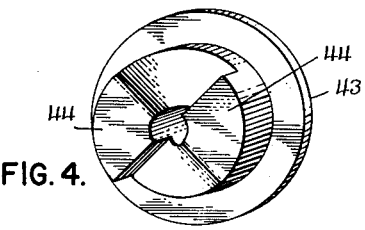

One of the greatest tragedies of our age is the appallingly high loss of lives and serious injuries, as well as the property damage which has been caused by the careless operation of high-speed modern highway vehicles. The excessive speeds at which the modern vehicle is consistently driven, particularly under certain unfavorable and unsafe driving conditions, frequently results in disastrous accidents, and despite the fact that much time, effort and expense have been put into various types of traffic-control systems and apparatus, the desired results have not been attained and traffic accidents continue to increase and to become more severe.

In view of the above-stated conditions, the automatic speed-signaling and speed-controlling system of this invention has been designed primarily for the purpose of influencing the operator of a vehicle to operate the vehicle at speeds which are considered safe under the existing driving conditions, but without, however, imposing positive restrictions on the speed of a vehicle such as might create traffic hazards. More specifically, the present signaling system is designed to automatically alert an operator by means of audible signals of variable frequency, of an increase in speed above a safe driving speed and, further, to warn the operator, passengers and other of the fact that the vehicle is being driven at an excessive speed within a given speed zone. In this connection, the speed-signaling system of the invention is adapted to be set for different speed limits such as are met under normal driving conditions. The speed-signaling system is also designed to be responsive to control-means suitably located in a speed-restricted highway along which a vehicle is being driven, for the purpose of automatically conditioning the signaling-system to indicate speeds in excess of the maximum speed limit of the speed-restricted highway. Furthermore, the speed-signaling system of this invention is designed to effect an economy in the operation of the vehicle and to reduce excessive wear-and-tear and abuse of the vehicle by providing the operator with an audible signal for indicating a change in a predetermined relationship between the speed of the vehicle and the speed of its driving engine.

*The showing of Figs. 1a to 4 inclusive*

The particular speed-alarm system illustrated in Figs. 1a to 4 inclusive, for purposes of making clear one form which the present invention may assume, includes an engine-driven shaft 15 which may be connected in any suitable manner to the internal-combustion engine of an automobile or other similar vehicle or means of motor power. By way of example, the shaft 15 may be connected to the distributor-shaft of an internal-combustion engine or to any other suitable part of the driving motor, though the connection referred to should be independent of any clutch employed in the vehicle so that it always responds to the engine speed regardless of whether or not the clutch is in or out.

The engine-driven shaft 15 has rigidly coupled thereto a worm 16 meshing into and driving a worm-wheel 17 which is pinned or otherwise rigidly attached to a shaft 18. Substantially midway of its length, the shaft 18 has rigidly attached to it a hub 19 rigidly carrying a radially-projecting stud 20 upon which latter is mounted with freedom for rotation a bevel gear 21.

The bevel gear 21 above referred to meshes into two similar but opposed bevel gears 22 and 23 respectively mounted on opposite sides of the hub 19 upon the engine-driven shaft 18 but with freedom for rotation with respect thereto.

The bevel gear 23 is integral with or otherwise made unitary with a spur-gear 24 which meshes into and is driven by a spur-pinion 25, as is indicated in Fig. 1a, rigidly mounted upon a vehicle-driven shaft 26 extending in parallelism with respect to the engine-driven shaft 18.

Rigidly secured to the vehicle-driven shaft 26 is an inner clutch-member 27 which, together with a cup-shaped outer clutch-member 28, form parts of a one-way clutch as will presently appear. The inner clutch-member 27 is provided on its periphery with a plurality of notches 29 (Fig. 2) the floor of each of which provides a tangential surface serving to clamp the adjacent one of a plurality of coupling-members 30 against the inner periphery of the flange 31 of the outer clutch-member 28 under circumstances as will hereinafter appear. The coupling-members 30 above referred to are, in the present instance, in the form of balls and adjacent each of the said coupling-members there is mounted in the inner clutch-member 27 one of a plurality of helical springs 32, each of which serves to yieldingly urge its complemental coupling-member 30 into the smaller end of the wedge-shaped space provided by a given one of the notches 29 and the adjacent inner surface of the flange 31, all as especially well shown in Fig. 2. The construction and arrangement of the parts 27 to 32 inclusive (the one-way clutch-mechanism) is such as to permit the outer clutch-member 28 and the parts directly connected thereto to overrun or freely turn with respect to the inner clutch-member 27 in the direction indicated by the arrow in Figs. 1a and 2.

The outer clutch-member 28 is rigid with a spur-pinion 33 which, together with the said clutch-member, is free to turn relative to the vehicle-driven shaft 26. The spur-pinion 33 meshes into a spur-gear 34 which is mounted with freedom for relative rotation upon the shaft 18 before described. The spur-gear 34 has projecting from its inner face an annular flange 35 which, in effect, constitutes an outer clutch-member in the same manner as does the flange 31 previously described and is complemented by an inner clutch-member 36 rigid with and forming a hub for the bevel gear 22 previously described. Interposed between the inner periphery of the flange 35 and the inner clutch-member 36 is one or more coupling-members 37 similar to the coupling-member 30 before described. The elements 35, 36 and 37 constitute a one-way clutch-mechanism corresponding to that provided by the previously described parts 27 to 32 inclusive but reversely arranged so that the spur-gear 34 may overrun with respect to the bevel gear 22 in the direction indicated by the arrow on the flange 35 in Fig. 1a.

The spur-gear 34 above described meshes into a spur-gear 38 and on different occasions (as will hereinafter appear) it drives or is driven by the said spur-gear 38. The said spur-gear 38 is mounted with freedom for rotation upon a motor-driven shaft 39 extending in substantial parallelism with the shafts 18 and 26 above described. The spur-gear 38 just referred to is provided with a rigid inwardly-projecting hub 40 which latter is formed in its inner end with a coupling-notch 41 which receives, with a sliding fit, a coupling-finger 42 which rigidly projects from a cam-head or control-member 43 mounted upon the shaft 39 with capacity for both rotary and axial reciprocative movements with respect thereto. On its face opposite its coupling-finger 42, the cam-head 43 is formed with two diametrically-opposite wedge-shaped cam-lugs 44—44 (Fig. 4) coacting with two similar cam-lugs 45—45 formed on the inner face of a cam-head or control-member 46 which complements the cam-head 43 previously described.

The cam-head 46 just above referred to is rigidly attached to the right end of the motor-driven shaft 39 and, in turn, rigidly carries a worm-wheel 47. Encircling the hub 40 of the spur-gear 38 is a helical compression spring 48 which yieldingly urges the cam-head 43 toward its complemental cam-head 46 as is indicated in Fig. 1a.

Meshing into and driving the worm-wheel 47 is a worm 49 rigidly mounted upon a motor shaft 50 and extending at substantially a right angle with respect to the shaft 39. The motor shaft 50 may be an element of a fractional horse-power electric motor 51 of a suitable type which will provide substantially-constant speed for a given voltage impressed thereon.

Returning now to the vehicle-driven shaft 26, it should be noted, as indicated in Fig. 1a, that the right end of the said shaft may be connected to a speedometer of the automobile or other vehicle in order to drive the said speedometer, while the left end of the said shaft 26 is connected by means of a flexible shaft 52 or other suitable means to the speedometer take-off mechanism indicated at 53 in Fig. 1a, and forming a usual feature of automobiles and the like and thus requiring no detailed description herein. The said speedometer take-off 53 is, as usual connected to the rear end of a gearshift-housing or transmission 54 and has projecting therethrough, the usual drive-shaft 55 extending rearwardly to the differential of the automobile or the like, and like the flexible-shaft 52 operable only when the vehicle is moving.

Mounted in the gearshift-housing 54 with capacity for reciprocation forward and back therein is a rod 56 carrying a gearshifting-slide 57 forming a usual feature of an automobile transmission and constituting the first-speed and reverse-speed slide thereof.

The gearshifting-slide 57 above referred to is modified inasmuch as it is provided respectively adjacent its rear and forward ends with a first- or low-speed notch 58 and a reverse-speed notch 59.

Mounted for reciprocation in the bottom wall of the gearshift-housing 54 is an actuating-rod 60 having its upper end rounded and held in engagement with the gearshifting-slide 57 by means of a helical spring 61. The projecting outer end of the actuating-rod 60 engages with a flexible switch-arm 62 carrying a contact 63 adapted to engage with a fixed contact 64 under the inherent tension of the switch-arm 62, when the gearshifting-slide 57 is moved into either its first-speed or reverse-speed positions. The contact 64 is mounted at the outer end of a relatively-rigid switch-arm 65 as is shown in the lower portion of Fig. 1a.

For purposes of description, we may return to the cam-head 43 indicated in the right central portion of Fig. 1a. A signal-control lever 66 is mounted adjacent the said cam-head and is hung for pivotal movement intermediate its respective opposite ends upon a pivot-pin 67. The upper end of the lever 66 is provided with a roller 68 engaging with the outer face of the flanged end of the cam-head 43. Below its pivot-pin 67 the lever 66 has, in turn, pivoted thereto an actuating finger 68a having its lower end normally engaged with an inclined cam-surface 69 of a spring-metal striker-arm 70 having its outer end rigidly secured in a stationary support 71, and having its opposite end provided with a striker 72 adapted to engage with a gong 73 or other resonating member. Adjacent the lower end of the actuating-finger 68a, there is provided a stationary stop-pin 70a which is adapted to check the upward swinging movement of the outer portion of the flexible striker-arm 70 after the same has been depressed and released by the actuating-finger 68a in a manner as will hereinafter appear.

Normally engaged with the upper portion of the signal-control lever 66 is an insulating finger 74 mounted at the upper end of a flexible switch-arm 75 carried by an insulating-support 76 as is indicated in Fig. 1a. On the side opposite from the finger 74, the upper end of the switch-arm 75 is provided with a contact 77 adapted to be moved into engagement with a contact 78 at the upper end of a flexible switch-arm 79 also carried at its lower end by the insulating-support 76.

Opposite its contact 78, the switch-arm 79 also carries a contact 80 which is adapted to engage with a contact 81 mounted upon the upper end of a flexible switch-arm 82. At its lower end, the switch-arm 82 is supported by the insulating-support 76.

The central flexible switch-arm 79 of the group above referred to is connected by means of a wire 83 to one terminal of a storage battery 84 indicated in Fig. 1c, and having its opposite terminal grounded as shown. Tapped into the wire 83 just referred to (Fig. 1c) is a wire 85 leading to the pivoted end of a manually-operable switch-blade 86. The said switch-blade is adapted to coincidentally engage a contact 87 and a contact 88. The contact 87 may be connected by means of a wire 89 to the ignition system of an automobile or the like.

Leading from the contact 88 just above referred to is a wire 90 connected to one end of a resistor 91 designed and adapted to limit the electrical energy supplied to the electric motor 51 before described. The remaining terminal of the resistor 91 is connected by means of a wire 92 to the pivot end of a manually-operable switch-blade 93 (Fig. 1a) engageable with a contact 94. The contact 94 is electrically connected to one terminal of the motor 51, while the remaining terminal of the said motor is grounded as indicated.

The switch comprising the switch-blade 93 and its complemental contact 94 are preferably located in some concealed or unobtrusive portion of the vehicle so as to guard against theft of the vehicle in a manner as will hereinafter appear.

Connected into the wire 90 (Fig. 1c) is a wire 95 leading to the pivoted end of an armature 96 formed of magnetic material and having a complemental contact 97. The said contact 97 is connected by means of a wire 98 to the fixed switch-arm 65 previously described and shown in the lower portion of Fig. 1a. The flexible switch-arm 62 complementing the switch-arm 65 is connected by means of a wire 99 to the wire 92 as is indicated in Fig. 1c.

Tapped into the wire 99 just above referred to is a wire 100 (Fig. 1c) leading to a contact 101 adapted to be engaged by a pivotal manually-operable switch-blade 102. The pivoted end of the said switch-blade 102 is connected by means of a wire 103 to the wire 98 before described.

In addition to engaging with the contact 101, the pivotal switch-blade 102 is also adapted to coincidentally engage with a contact 104 having a wire 105 leading to one terminal of a signal-lamp 106 which latter has its remaining terminal grounded as shown in Fig. 1c.

Preferably and as shown in the upper right-hand portion of Fig. 1c there is employed a mercury switch generally designated by the reference character 107 and having one of its terminals connected by a wire 108 to the wire 98 and having its remaining terminal connected by means of a wire 109 to the wire 99, all as indicated in the upper right-hand portion of Fig. 1c.

The mercury switch 107 above referred to is mounted on the vehicle so as to be inclined upwardly and rearwardly with respect thereto whereby when the vehicle is climbing a steep hill, the said mercury switch will short circuit or shunt-out the resistor 91 from the power supply to the motor 51, or for purposes as will hereinafter appear.

Returning now again to Fig. 1a, it will be noted that the flexible switch-arm 82 is connected by means of a wire 110 to one terminal of an electromagnet 111 (Fig. 1b). The said wire 110 also leads to an armature 112 adapted to be attracted by the electromagnet 111, and engageable at its free end with a contact 113. The contact 113 is connected by means of a wire 114 to one terminal of an electrical signal, preferably in the form of a chime, and indicated in the upper left-hand portion of Fig. 1b by means of the reference character 115. The remaining terminal of the chime or signal 115 is grounded as shown.

The remaining terminal of the electromagnet 111 just above described and shown at the left of Fig. 1b is connected by means of a wire 116 to the pivotal end of an armature 117 and to one end of a bimetallic switch-arm 118. At its free outer end, the switch-arm 118 is provided with a contact 119 adapted to engage with a complemental contact 120 mounted at the free end of a complemental bimetallic switch-arm 121 which latter has its fixed end grounded as shown. Both of the bimetallic switch-arms 118 and 121 are of a type common in the art and, when heated, each is caused to flex toward the other to thereby engage the contacts 119 and 120. For the purpose of indirectly heating the bimetallic switch-arms 118 and 121, there is provided two similar heating-coils 122—122 connected in series and having one outer terminal connected to ground and the other terminal connected to the wire 114.

Returning again to the flexible switch-arm 75 shown in Fig. 1a, it will be noted that the said switch-arm is connected by means of a wire 123 to the fixed end of a bimetallic switch-arm 124 indicated in the central portion of Fig. 1b adapted to engage at its free end, when heated, with a contact 125. The said bimetallic switch-arm is adapted to be heated by a heating-coil 126 having one terminal tapped into the wire 123 and its other terminal grounded as shown.

Connected by means of a wire 127 to the wire 123 is one terminal of an electromagnet 128 having its opposite terminal grounded as shown. Adjacent one end of the said electromagnet is an armature 129 adapted to engage with a contact 130 when the said electromagnet 128 is deenergized.

As is also indicated in Fig. 1b, a wire 131 serves to connect one end of a pivotal armature 132 and one terminal of an electromagnet 133 with the wire 123. The said electromagnet is adapted to attract the armature 132 and cause the same to engage with a contact 134 connected by means of a wire 135 to the wire 83 before referred to.

The remaining terminal of the electromagnet 133 just previously described is connected by means of a wire 136 to the fixed end of a flexible accelerator-operated switch-arm 137, as is indicated in the left central portion of Fig. 1c. The said switch-arm is provided adjacent its free end with a contact 138 which is adapted to be forced into engagement with a complemental contact 139 by the inherent tension of the switch-arm 137. Said contact 139 is mounted upon the outer end of a relatively-rigid switch-arm 140 which also has a contact 141. The contact 141 is adapted to be engaged by a contact 142 mounted at the outer end of a flexible switch-arm 143 as is indicated in Fig. 1c. The relatively-rigid switch-arm 140 has its inner end connected to ground as is indicated in Fig. 1c.

Interposed between the free ends of the respective flexible switch-arms 137 and 143 is a collar 144 formed of insulating material and rigidly mounted upon a throttle-plunger 145 controlling, in a manner usual in art, the throttle of the automobile or other vehicle. At its upper end, the throttle-plunger 145 is pivotally connected to the free end of an accelerator-pedal 146 pivoted at its lower end to a bracket 147 and urged to swing in a counterclockwise direction by means of a helical spring 148. It may here be noted that the tension of the spring 148 is stronger than the inherent tension of the flexible switch-arm 137, so that when the said accelerator-pedal is free of foot pressure, the flexible switch-arm will be flexed upwardly as shown in Fig. 1c.

As is shown in the upper right-hand portion of Fig. 1b, there is preferably employed a mercury switch generally designated by the reference character 149 and having one of its terminals connected by means of a wire 150 to the wire 136 and having its remaining terminal grounded as indicated.

The mercury switch 149 above referred to is mounted on the vehicle so as to be inclined upwardly and forwardly with respect thereto so that when the vehicle is traveling downgrade on a relatively-steep hill, the said mercury switch will provide energy to the electromagnet 133 independently of the accelerator-operated switch-mechanism (Fig. 1c). In other words, the mercury switch 149, under the conditions just referred to, will provide a complete circuit through the electromagnet 133 even though the contacts 138 and 139 (Fig. 1c) are open at the time.

As is indicated in the lower right-hand portion of Fig. 1b, there is also employed an electromagnet 151 with which is associated an armature 152 which is pivoted at its left end as viewed in Fig. 1b. The right end of the armature 152 is connected by means of an insulating-link 153 to the outer or free end of a flexible switch-arm 154. Adjacent its free end, the flexible switch-arm 154 just referred to is provided with a contact 155 which is normally out of engagement with a complemental contact 156 carried by the free end of a flexible switch-arm 157. Inwardly of its contact 156, the flexible switch-arm 157 is provided with a contact 158 which normally is in engagement with a complemental contact 159 carried at the outer end of a relatively-rigid switch-arm 160.

Located below the flexible switch-arm 157 is another flexible switch-arm 161 having its outer or free end coupled to the insulating-link 153 by being extended into a notch 162 in the latter, as is indicated in the lower right-hand portion of Fig. 1b. The said switch-arm 161 is provided with a contact 163 which is normally out of engagement with a complemental contact 164 carried at the outer end of a flexible switch-arm 165.

The respective inner ends of all of the switch-arms 154, 157, 160, 161 and 165 are held in spaced relationship and insulated from each other by a suitable body of insulation indicated by the reference character 166 in the lower right-hand portion of Fig. 1b.

The rigid switch-arm 160 previously referred to is connected by means of a wire 167 to the contact 125 which is cooperated with as previously described by the bimetallic switch-arm 124. A wire 168 serves to connect the flexible switch-arm 157 to one terminal of the electromagnet 151 previously described and which electromagnet has its remaining terminal connected to ground by means of a wire 169.

The flexible switch-arm 154 is connected by means of a wire 170 to a relatively-rigid switch-arm 171 forming part of a manually-operable make-before-break switch generally designated by the reference character 172 in the lower left-hand portion of Fig. 1b.

The rigid switch-arm 171 above referred to, is provided with a contact 173 normally engaging a complemental contact 174 provided on a flexible switch-arm 175 and forming part of the switch 172. The said switch-arm 175 also has a contact 176 located at the free end of the said switch-arm and normally out of engagement with a complemental contact 177 carried on the free end of a flexible switch-arm 178.

The make-before-break switch 172 above referred to also includes a reciprocating push-button 179 which is guided for movement in the outer end of a supporting-member 180. Said supporting-member 180 and the respective switch-arms 171, 175 and 178 extend in substantial parallelism with each other and have their fixed ends spaced and insulated from each other by a suitable body of insulation indicated by the reference character 181 in the lower left-hand portion of Fig. 1b.

The make-before-break switch 172 is preferably installed at a location on the vehicle which is remote from either the operator or any of the passengers so as to require that the vehicle be stopped before its operation can be effected manually.

The flexible switch-arm 175 of the switch 172 is connected by means of a wire 182 to a wire 183 which extends intermediate the wire 83 and the switch-arm 161 at the lower right portion of Fig. 1b.

The pivotal armature 129 previously described and shown as adjacent the electromagnet 128 in the central portion of Fig. 1b, is connected by means of a wire 184 to the wire 170. The contact 130 with which the armature 129 engages, is connected by means of a wire 185 to one terminal of an electromagnet 186 illustrated in the upper left-hand portion of Fig. 1c. The electromagnet 186 has associated with its respective opposite ends pivotal armatures 187 and 188.

The terminal of the electromagnet 186 opposite that to which the wire 185 is connected, is connected by means of a wire 189 to the armature 188 and to one terminal of a push-button switch generally designated by the reference character 190 and which is preferably located within the vehicle in position for convenient manipulation by the operator thereof. A wire 191 connects the remaining terminal of the push-button switch 190 to ground as indicated.

The energization of the electromagnet 186 (in addition to discharging another function) will move the armature 188 into engagement with a contact 192 which is connected by means of a wire 193 to the switch-arm 143 of the accelerator-operated switch. The energization of the electromagnet 186 also serves to attract the armature 187 so as to disengage it from a contact 194 with which it is normally engaged and into engagement with a contact 195.

The upper contact 194 adjacent the armature 187 is connected by means of a wire 196 to an electric horn or other suitable electrical audible signal or visual signal 197 as indicated in the upper central portion of Fig. 1c. The remaining terminal of the horn 197 is grounded as shown. The wire 196 just referred to, is connected by means of a wire 198 to the flexible switch-arm 178 of the make-before-break switch 172 appearing in the lower left portion of Fig. 1b, and previously described. The pivotal armature 187 is connected by means of a wire 199 to the flexible switch-arm 165 previously described and indicated in the lower right-hand portion of Fig. 1b.

The lower contact 195 with which the pivotal armature 187 is adapted to engage when the electromagnet 186 is energized, is connected by means of a wire 200 to an electromagnet 201 indicated in the central left-hand portion of Fig. 1c. The remaining terminal of the said electromagnet 201 is connected to ground as shown.

Mounted adjacent the lower end of the electromagnet 201 just above referred to is a pivotal armature 202 in turn pivotally connected at its outer end to a valve-plug 203 as is shown in the left-hand central portion of Fig. 1c. The said valve-plug is adapted to reciprocate in one wall of a valve-housing 204 so as to open and close a vent-opening 205 therein. The said valve-housing 204 also has a second vent-opening 206 which, like the vent-opening 205, opens to the atmosphere. The said vent-opening 206 has cooperating therewith a needle-valve 207 threaded into the wall of the housing opposite the vent-opening 206 but in axial alignment therewith. The needle-valve 207 may be adjusted toward or away from the vent-opening 206 to restrict or open up the same as desired.

The valve-housing 204 above referred to has communicating with it a duct 208 leading to one side of a diaphragm-housing 209 which latter is substantially bisected by a flexible diaphragm 210 so as to, in effect, divide the said diaphragm-housing into two compartments. Connected into the duct 208 just referred to is another duct 211 which extends to and is in communication with the interior of a governor-housing 212 forming a well known feature of trucks and vehicles, and normally interposed between the carburetor and the intake manifold to limit the speeds of an engine or the like.

Mounted upon a diametrical shaft 213 is a butterfly-valve 214 mounted in the governor-housing 212 and adapted to be turned therein to open and close the fuel-passage therein in a manner well known in the art.

The shaft 213 above referred to is supported in the governor-housing 212 and carries a crank-arm 215 which is connected by means of a link 216 to a piston-rod 217 mounted with capacity for reciprocation in the right side wall of the diaphragm-housing 209, and rigidly coupled at its inner end to the diaphragm 210. A spring 218 connected to the crank-arm 215 serves to urge the butterfly-valve 214 into its open position.

It will be apparent from the foregoing that when a fuel mixture is flowing through the governor-housing 212, a vacuum will be created in the ducts 211 and 208, as well as in the valve-housing 204 and the portion of the diaphragm-housing 209 lying to the left of the diaphragm 210.

In conjunction with the other features above described, there is employed a second make-before-break switch generally designated by the reference character 219 and indicated in the lower right-hand portion of Fig. 1c. This switch 219 is manually-operable in a manner as will be presently described, and is preferably located in the vehicle in a position convenient for manipulation by the driver thereof.

The make-before-break switch 219 just above referred to includes a relatively-rigid supporting-member 220 and flexible switch-arms 221, 222 and 223, all extending in substantial parallelism with each other and connected together in insulated relationship at one of their respective opposite ends by a body of insulation as shown.

Mounted in the lower portion of the supporting-member 220 above referred to with capacity for reciprocation therein is a push-button 224 adapted to engage with the lower portion of the flexible switch-arm 221, to engage the contact 225 thereof with a complemental contact 226 located at the lower end of the switch-arm 223. Inwardly with respect to its contact 226, the flexible switch-arm 223 is provided with a second contact 227, which normally is in engagement with a complemental contact 228 carried by the lower end of the intermediate flexible switch-arm 222.

The flexible switch-arm 223 of the make-before-break switch 219 is connected by means of a wire 229 to the wire 83 previously described. The companion flexible switch-arm 221 is connected by means of a wire 230 to one terminal of an electromganet 231 indicated in the lower left-hand portion of Fig. 1c. The remaining terminal of the electromagnet 231 is connected by means of a wire 232 to a bimetallic switch-arm 233 which, when normal and when cool, is in engagement with a contact 234 connected in turn by means of a wire 235 to ground. The said bimetallic switch-arm 233 is adapted to be heated by a heating-coil 236 located adjacent thereto and having one of its terminals connected to the wire 235 and having its opposite terminal connected by means of a wire 237 to the wire 230 before referred to. Connected to the wire 237 just referred to by means of a wire 238 is a signal-lamp 239 or other suitable electrical signal. The remaining terminal of the said signal-lamp 239 is grounded as shown. Also connected to the wire 237 is one end of a pivotal armature 240 which is adapted to engage with a contact 241 when the electromagnet 231 is energized. The contact 241 is connected by means of a wire 242 to the wire 229 as shown in the lower left-hand portion of Fig. 1c.

Returning again to the make-before-break switch 219, it will be noted that the intermediate flexible switch-arm 222 thereof is connected by means of a wire 243 to an armature 244 which is adapted to engage, though normally out of engagement with, a contact 245. The said contact 245 is connected by means of a wire 246 to a signal-lamp 247 or other suitable electrical signal. The said signal-lamp has its remaining terminal connected to ground as shown. The armature 244 just above referred to is located adjacent the upper end of a magnetic core 248 on which are mounted, in coaxial relationship, an energizing-coil 249 and an energizing-coil 250 as shown in the central left-hand portion of Fig. 1c. Both of the energizing-coils just referred to are adapted to magnetize the core 248, either singly or together, in a manner as will hereinafter appear. The upper terminal of the upper energizing-coil 249 is connected by means of a wire 251 to the wire 246 and hence to the contact 245. The remaining terminal of the energizing-coil 249 is connected to ground as shown. It will be noted that the armature 96 previously described is located adjacent the lower end of the core 248 so as to be acted upon thereby.

The two terminals of the lower energizing-coil 250 on the core 248 are connected by means of wires 252 and 253 to a full-wave rectifier generally designated by the reference character 254 and shown at the central lower portion of Fig. 1c. The rectifier 254 is in turn connected to an induction-coil 255 which is designed and adapted to be mounted on the chassis of the vehicle adjacent the ground level thereof so that when passing over an alternating current induction-coil mounted in the roadway, the induction-coil 255 will be energized and, by means of the full-wave rectifier 254 supply direct current to the energizing-coil 250 to which the wires 252 and 253 lead.

*Operation of the apparatus of Figs. 1a to 4 inclusive*

WHEN THE VEHICLE IS AT A STANDSTILL

For purposes of making clear the operation of the automatic speed-alarm system above described and illustrated in the drawings in Figs. 1a to 4 inclusive, it is convenient to first assume that the automobile or other vehicle with which the system is associated is at a standstill and is not inclined sufficiently to permit the mercury of the mercury switch 107 to engage with the upper contact thereof. It may further be assumed that the operator of the vehicle has manually moved the switch-blade 86 into engagement with the complemental contacts 87 and 88 and also that the switch-blade 93 is in engagement with its complemental contact 94. Still further, it may be assumed that the transmission mechanism of the vehicle is in the "neutral" position and the switch-blade 102 is out of engagement with its complemental contacts 101 and 104.

Under the conditions above described, the electric motor 51 will be energized through the circuit which includes the elements 83, 85, 86, 88, 90, 91, 92, 93 and 94. The electric motor 51, for example, may be assumed to be constructed to rotate its shaft 50 at 3000 R. P. M. when a potential difference of six volts is applied to its terminals. The resistor 91, which forms an element of the circuit just described, may provide a voltage drop which causes the electric motor 51 to rotate its shaft 50 at 2250 R. P. M., when in series with the said motor, as it is under the conditions here assumed for purposes of description.

The rotation of the shaft 50 of the electric motor 51 at 2250 R. P. M. will similarly rotate the worm 49 which, in turn, will rotate the worm-wheel 47 at 112.5 R. P. M. Under the conditions just described, the cam-head 46 will rotate the cam-head 43 in the direction indicated in Fig. 1a at the above-stated rate of 112.5 R. P. M.

The rotation of the cam-head 43 will effect the rotation of the spur-gear 38, spur-gear 34, and the outer clutch-member 35 at 112.5 R. P. M. and thus drive the spur-pinion 33 and outer clutch-member 28 at 562.5 R. P. M.

It may now be assumed that the engine of the automobile or other vehicle is revolving at 1000 R. P. M. and hence below a pre-selected critical speed of 1125 R. P. M. Bodily rotation of the bevel gear 21 will thus be effected at 50 R. P. M. through the intermediary of the shaft 15, worm 16, worm-wheel 17 and shaft 18. The bevel-gear 22 and the inner clutch-member 36 will be rotated at twice the rate (i. e., 100 R. P. M.) of bodily rotation of the bevel gear 21 and in the same direction, since at this time the bevel gear 23 will be held stationary by the flexible-shaft 52, which is also stationary at this time (the vehicle being at rest). Inasmuch as the rotation of the inner clutch-member 36 will be less (i. e., 100 R. P. M.) than the speed (112.5 R. P. M.) at which the complemental outer clutch-member 35 is at this time being driven by the motor 51 the outer clutch-member 35 will overrun the inner clutch-member 36.

Under the conditions above described, none of the alarm-means 73, 115 and 197 will be put into operation.

It may now be assumed that the engine of the vehicle is caused to operate at 1375 R. P. M. and hence in excess of the aforesaid critical speed of 1125 R. P. M. Under this condition, the inner clutch-member 36 will run at 137.5 R. P. M., and hence in excess of the speed (112.5 R. P. M.) at which the complemental outer clutch-member 35 has been driven by the motor 51. The clutch-member 35 will now be driven by the inner clutch-member 36 at speeds in consonance therewith, rather than by the motor 51. The outer clutch-member 28, spur-pinion 33, spur-gear 34, and spur-gear 38 will now be driven by the engine of the vehicle instead of by the electric motor 51 as previously, with the result that the cam-head 43 will be turned in the direction of the arrow in Fig. 1a at a speed of 137.5 R. P. M.

Now that the cam-head 43 is being rotated at a speed higher than the speed at which the cam-head 46 is being rotated by the electric motor 51, the resultant relative rotation will cause the cam-lugs 44—44 and cam-lugs 45—45 to coact to effect the respective axial movement of the cam-head 43. The axial movement of the cam-head 43 will be effected two times for each revolution of the said cam-head 43 with respect to the companion cam-head 46 which, under the conditions now being described, will be at the rate of 50 cycles per minute.

As the cam-head 43 reciprocates as just described, it will effect the oscillation of the signal-control lever 66, which latter, in turn, will cause the striker 72 to engage with the gong 73 to produce an audible signal. The movement of the signal-control lever 66 will also flex the switch-arm 75 and the switch-arm 79 to substantially concurrently move the contact 77 into engagement with the contact 78 and the contact 80 into engagement with the contact 81. By this action, electrical energy is supplied from the storage battery 84 to both the chime 115 and the heating-coils 122—122 through the circuit which consists of the elements 83, 79, 80, 81, 82, 110, 112, 113 and 114. The energization of the chime 115 effects an audible signal. The energization of the heating-coils 122—122 heats the bimetallic switch-arms 118 and 121 thereby causing the latter to distort and move the contacts 119 and 120 into engagement. The engagement of the contacts 119 and 120 effects the energization of the electromagnet 111, which will move the armature 112 out of engagement with the contact 113 and also move the armature 117 into engagement with the "ground."

The armature 117 and its ground constitute elements of a locking-circuit which maintains the energization of the electromagnet 111 until such time as the contact 80 is moved out of engagement with the contact 81 under the control of the axial movement of the cam-head 43. The movement of the armature 112 out of engagement with the contact 113 deenergizes the chime 115 and the heating-coils 122—122. The movement of the contact 80 out of engagement with the contact 81 effects the deenergization of the electromagnet 111, thereby restoring the armature 112 into engagement with the contact 113 and permitting the armature 117 to move out of engagement with the ground.

It will be understood that the above-described cycle of operation occurs for each cycle of operation of the axial movement of the cam-head 43. If the operator of the vehicle should maintain the rotation of the engine at 1375 R. P. M. while the vehicle is at a standstill, the chime 115 and the gong 73 will sound at the rate of 50 times per minute.

It may now be assumed that the operator of the vehicle is maintaining the depression of the accelerator-pedal 146, thereby permitting the contact 138 to remain in engagement with its complemental contact 139. The initial engagement of the contact 77 with the contact 78 will energize the electromagnets 128 and 133 through the circuit which includes the elements 83, 79, 78, 77, 75, 123, 131, 136, 137, 138, 139 and 140. Thereafter, steady energization of the electromagnets 128 and 133 will be maintained through the locking-circuit controlled by the said electromagnet 133 and which includes the armature 132 and contact 134. The steady energization of the electromagnet 128 will maintain the armature 129 out of engagement with the contact 130, for purposes as will hereinafter appear.

Coincidentally with the energization of the electromagnets 128 and 133, the heating-coil 126 will be energized, thus causing it to heat the bimetallic switch-arm 124. If the operator of the vehicle does not restore the accelerator-pedal 146 to its idle position within the predetermined time-interval of one minute, the bimetallic switch-arm 124 will distort sufficiently to cause it to engage with the contact 125, thereby completing the circuit to the electromagnet 151.

The resulting energization of the electromagnet 151 will move the contact 155 into engagement with the contact 156 which, in turn, will flex the switch-arm 157, thereby also moving the contact 158 out of engagement with the contact 159. This operation establishes a locking-circuit for the energization of the electromagnet 151, which locking-circuit includes the elements 84, 83, 183, 182, 175, 174, 173, 171, 170, 154, 155, 156, 157, 168, 151, and 169 to ground. The energizing-circuit through the bimetallic switch-arm 124 and the contact 125 is interrupted by the above-described movement of the contact 158 out of engagement with the contact 159.

The above-described energization of the electromagnet 151 also moves the contact 163 into engagement with the contact 164 for the purpose of continuously (rather than intermittently) energizing the electric horn signal 197. The energizing-circuit for the horn signal 197 includes the elements 84, 83, 183, 161, 163, 164, 165, 199, 187, 194, 196 and horn signal 197 to ground. It will be readily understood that while the horn signal 197 is continuously energized for a very definite purpose, its continued operation cannot be tolerated by those within hearing. As soon as possible, the operator of the vehicle is practically forced to restore the accelerator-pedal 146 to its idle position and to manually operate the push-button switch 190. The restoration of the accelerator-pedal 146 to its idle position moves the contact 138 out of engagement with the contact 139, thus effecting the deenergization of the electromagnets 128 and 133. By this deenergization of the electromagnet 128, the armature 129 is restored into engagement with the contact 130, which permits the operation of the push-button switch 190 to, in turn, energize the electromagnet 186 through the circuit which includes the elements 84, 83, 183, 182, 175, 174, 173, 171, 170, 184, 129, 130, 185, 186, 189, 190 and 191 to ground. The energization of the electromagnet 186 establishes a locking-circuit for the continued energization thereof, which locking-circuit includes the elements 188, 192, 193, 143, 142, 141, and 140 to ground.

The described energization of the electromagnet 186 will move the armature 187 out of engagement with the contact 194 and into engagement with the contact 195, thereby deenergizing the horn signal 197 and coincidentally energizing the electromagnet 201. The energization of the electromagnet 201 attracts the armature 202, which results in the movement of valve-plug 203, thus closing the vent-opening 205 in the valve-housing 204.

The closing of the vent-opening 205 increases the vacuum on the left side of the flexible diaphragm 210. It will be readily understood that increase in speed of the engine of the vehicle will increase the degree of vacuum, and when a predetermined speed thereof is reached, the opposing urge of the spring 218 will be overcome and the diaphragm 210 will be moved to the left. This movement of the diaphragm 210 will effect movement of the butterfly-valve 214, to restrict the passage of motive fluid through the governor-housing 212, thereby reducing the speed of the engine of the vehicle.

As a logical next step in the operation of the vehicle, the operator thereof will operate the transmission-mechanism into the first-speed position. The resulting movement of the gearshifting-slide 57 will permit the actuating-rod 60 to move inwardly in the transmission-housing 54 and into the first-speed notch 58, thereby permitting the flexible switch-arm 62 to move its contact 63 into engagement with the complemental contact 64. The engagement of the contact 63 with the contact 64 will short-circuit the resistor 91 of the energizing-circuit for the electric motor 51 through the path which includes the elements 95, 96, 97, 98, 65, 64, 63, 62 and 99.

Now that the resistor 91 is short-circuited, the total voltage of the storage battery 84 is applied to the terminals of the electric motor 51, thereby effecting the rotation of its shaft 50 at the maximum predetermined rate of 3000 R. P. M., instead of at the rate of 2250 R. P. M. as under the conditions previously described. The rotation of the shaft 50 at the rate of 3000 R. P. M. will effect the rotation of the cam-head 46 and the cam-head 43 at the rate of 150 R. P. M.

The just-described rotation of the cam-head 43 will rotate the spur-gear 34 and the outer clutch-member 35 carried thereby, at the same rate of 150 R. P. M., thereby permitting the bevel gear 22 and its inner clutch-member 36 to be rotated at a higher rate, but not exceeding 150 R. P. M. and without effecting axial movement of the said cam-head 43. The automobile or other vehicle being at a standstill, the maximum speed of the engine thereof will be 1500 R. P. M. instead of 1125 R. P. M., as previously described under the conditions when the resistor 91 was included as an element of the energizing-circuit of the electric motor 51. As indicated in the chart of Fig. 7, the rotation of the engine of the vehicle at the rate of 1500 R. P. M. will effect the rotation of the shaft 18 and hence also the bodily rotation of the bevel gear 21 at the rate of 75 R. P. M.

It may now be assumed that while the vehicle is still at rest, the engine is caused to exceed the 1500 R. P. M. Under such conditions, the outer clutch-member 35 will again be driven by the inner clutch-member 36 and at speeds in consonance therewith. The outer clutch-member 28, spur-pinion 33, spur-gear 34, spur-gear 38 and cam-head 43 will again be rotated in relationship with the rotation of the engine of the vehicle, instead of by the electric motor 51.

Now that the cam-head 43 is being rotated at a speed higher than that at which the cam-head 46 is being rotated by the electric motor 51, the relative rotation thereof will cause the cam-lugs 44—44 and cam-lugs 45—45 to coact to effect the axial movement of the cam-head 43 in repeating cycles. The axial movement of the cam-head 43 will effect the operation of the oscillation of the signal-control lever 66, thus causing the gong 73 and the chime 115 to give audible signals in the manner previously described. If the operator of the vehicle now should increase the speed of the engine to 1750 R. P. M. while the vehicle is still at a rest and with the transmission-mechanism in the first-speed position, the chime 115 will be energized and deenergized 50 times per minute in consonance with the cycles of axial movement of the cam-head 43. The further increase of engine speed to 1875 R. P. M. will effect repeating cycles of energization and deenergization of the chime 115 at the rate of 75 times per minute.

As previously described, the initial engagement of the contact 77 with its complemental contact 78 as effected by the axial movement of the cam-head 43 will, in turn, effect the energization of the electromagnets 128 and 133, which energization will be steadily maintained by the locking-circuit which includes the contact 134 and the armature 132.

The described energization of the electromagnet 128 will move the armature 129 out of engagement with the contact 130, thereby deenergizing the electromagnet 186. The deenergization of the electromagnet 186 will open its locking-circuit by the movement of the armature 188 out of engagement with its complemental contact 192 and will also permit the armature 187 to move out of engagement with the contact 195 and into engagement with the contact 194. The movement of the armature 187 out of engagement with the contact 195 will deenergize the electromagnet 201, thus precluding the butterfly-valve 214 from being moved into position to restrict the flow of motive fluid to the engine of the vehicle. The engagement of the armature 187 with the contact 194 again effects the steady energization of the horn signal 197.

In order to effect the stoppage of the sounding of the horn signal 197, the operator of the vehicle will be required to restore the accelerator-pedal 146 to its idle position and to manually operate the push-button switch 190. The restoration of the accelerator-pedal 146 to its idle position will move the contact 138 out of engagement with the contact 139, thereby effecting the deenergization of the electromagnets 128 and 133. By this latter action, the armature 129 is restored to engagement with the contact 130, thus permitting the operation of the push-button switch 190 to again energize the electromagnet 186 for the purpose of deenergizing the horn signal 197 and energizing the electromagnet 201.

It may now be assumed that the operator of the vehicle desires to restore the speed-alarm system of the present invention to the conditions of operation which existed previously to the energization of the electromagnet 151, which latter will be caused by the operation of the engine at speeds in excess of predetermined maximum speeds, i. e., 1125 R. P. M. when the gearshift is in neutral, and 1500 R. P. M. when the said gearshift is in first or low speed. The operator may now request another occupant of the vehicle to manually operate the push button 179 of the make-before-break switch 172 (which cannot be reached from the driver's seat), to move the contact 177 into engagement with the contact 176 and also to move the contact 174 out of engagement with the contact 173. The said switch 172, as has been before stated, is purposely located at a position remote from all occupants of the vehicle, thus necessitating a deliberate excursion by one of the latter in order to operate the said switch 172.

The described engagement of the contact 177 with the contact 176 will re-energize the horn signal 197 and the movement of the contact 174 out of engagement with the contact 173 will deenergize the electromagnet 151 to thus restore the flexible switch-arms 154, 157 and 161 to their normal positions indicated in Fig. 1b. The push button 179 is now relieved from manual pressure so that the make-before-break switch 172 may reassume its normal position, thereby deenergizing the horn signal 197.

WHEN THE VEHICLE IS MOVING FORWARD

It may now be assumed that the transmission-mechanism of the vehicle is still in the first-speed position and that the vehicle is moving forwardly at a rate of, for instance, 10 M. P. H. under the urge of the engine. The forward movement of the vehicle will cause the vehicle-driven shaft 26 to be rotated in the direction indicated in Fig. 1a. The spur-pinion 25 will be rotated in unison with the said shaft and will rotate the spur-gear 24 and hence also the bevel gear 23

Under the conditions above described, if the engine does not exceed 1750 R. P. M., as indicated in the chart of Fig. 7, the electric motor 51 will continue to cause the cam-head 46 to continue to rotate the cam-head 43 and hence the latter will have no axial movement imparted to it. In view of the fact that there is no axial movement imparted to the cam-head 43 under the conditions just described, no signal will be given.

It may now be assumed that the engine is caused to operate at 2000 R. P. M., though the vehicle still remains at 10 M. P. H. This condition can occur when the clutch is caused, for one reason or another, to slip, thus giving a disproportionately high engine speed compared to the forward speed of the vehicle. Under the conditions just referred to, the bevel gear 21 will be bodily rotated around the shaft 18 at 100 R. P. M. The described forward movement of the vehicle (10 M. P. H.) will cause the rotation of the bevel gear 23 at a rate of 25 R. P. M., as indicated in the chart of Fig. 7.

The described bodily movement of the bevel gear 21 at 100 R. P. M. combined with the rotation of the bevel gear 23 at 25 R. P. M., will cause the bevel gear 22 and its unitary inner clutch-member 36 to be rotated in the same direction, but in the present instance at the rate of 175 R. P. M. Under these conditions, the cam-head 43 will be rotated at 175 R. P. M. through the intermediary of the outer clutch-member 35, spur-gear 34 and spur-gear 38. Now that the cam-head 43 is being rotated at a speed higher than that at which the cam-head 46 is being rotated (150 R. P. M.) by the electric motor 51, the relative rotation thereof will cause the cam-lugs 44—44 and cam-lugs 45—45 to coact to effect the axial movement of the cam-head 43 in repeating cycles and at the rate of 50 cycles per minute.

Under the foregoing conditions, the axial movement of the cam-head 43 will cause the gong 73 and the chime 115 to function at the rate of 50 cycles per minute, thus indicating that the engine of the vehicle is operating at the speed of 2000 R. P. M., while the vehicle is moving forwardly at but 10 M. P. H.

As previously described, the initial engagement of the contact 77 with its complemental contact 78 as effected by the axial movement of the cam-head 43 will, in turn, effect the energization of the electromagnets 128 and 133, which energization will be steadily maintained by the locking-circuit which includes the armature 132 and the contact 134.

Having been warned by the sounding of the gong 73 and the chime 115 as above described, the operator of the vehicle should permit the restoration of the accelerator-pedal 146 to its idle position within the predetermined time-interval of one minute, thereby moving the contact 138 out of engagement with its complemental contact 139. By this action, the electromagnets 128 and 133 will be deenergized to thus prevent the energization of the horn signal 197.

It may now be assumed that the transmission-mechanism of the vehicle is reset into its second-speed position. The described resetting of the transmission-mechanism will cause the contact 63 to be moved out of engagement with its complemental contact 64, thereby removing the previously-existing short-circuit of the resistor 91 of the energizing-circuit of the electric motor 51. The electric motor 51 will thus be restored to its lower speed of rotation of 2250 R. P. M., which will again cause the cam-head 46 to be rotated at the rate of 112.5 R. P. M.

Under the conditions just above described and with the transmission-mechanism reset into its second-speed position, it may further be assumed that the vehicle is moving forwardly, for one reason or another, at speeds in excess of the 10 M. P. H. previously referred to. Reference to the chart of Fig. 6 will readily show the various engine speeds as compared to vehicle speeds at which no signal is given. For example, no signal will be given when the vehicle is moving forwardly at 15 M. P. H. until the engine exceeds the speed of 1500 R. P. M.

It may now be assumed that the transmission-mechanism has been reset into its high-speed or direct-drive position, and for one reason or another, the vehicle is moving forwardly at 55 M. P. H.

Under the conditions just above referred to, the cam-head 43 will be turned by the running-gear of the vehicle at a speed of 137.5 R. P. M. and hence at a speed greater than the 112.5 R. P. M. at which the complemental cam-head 46 is at this time being driven by the electric motor 51.

Under the conditions just described, the cam-head 43, in addition to being rotated, will have axial movement imparted to it by its coaction with its companion cam-head 46 and at the rate of 25 cycles per minute.

Under the foregoing conditions, the gong 73 and the chime 115 will again be caused to operate at the rate of 50 cycles per minute, thus indicating that the vehicle is moving at the excessive speed of 55 M. P. H. Assuming that the operator of the vehicle continues to maintain the operation of the accelerator-pedal 146 to maintain the excessive speed of 55 M. P. H., the contact 138 will remain in engagement with its complemental contact 139 so that the initial engagement of the contact 77 with the contact 78 will effect the energization of the electromagnet 133. Thereafter, steady energization of the electromagnets 128 and 133 will be maintained through the locking-circuit controlled by the said electromagnet 133, in the manner previously described.

The electromagnet 151 will again be energized one minute after the initial engagement of the contact 77 with the contact 78, thereby causing the steady energization of the horn signal 197, all in the manner previously described.

In order to effect the deenergization of the horn signal 197, the operator of the vehicle will be required to (a) restore the accelerator-pedal 146 to its idle position; (b) decrease the speed of the vehicle below 45 M. P. H.; and (c) manually operate the push-button switch 190. The restoration of the accelerator-pedal 146 to its idle position will again move the contact 138 out of engagement with the contact 139, thereby effecting the deenergization of the electromagnets 128 and 133. By this latter action, the armature 129 is restored into engagement with the contact 130, thus again permitting the operation of the push-button switch 190 to energize the electromagnet 186 for the purpose of deenergizing the horn signal 197 and energizing the electromagnet 201.

Now that the vehicle is being operated below the present maximum unrestricted speed of 45 M. P. H., it may be assumed that conditions develop which make it unsafe for the vehicle to be operated at speeds less than 50 M. P. H. Therefore, the operator of the vehicle will operate the accelerator-pedal 146 to the position which causes the contact 142 to be moved out of engagement with the contact 141, thereby effecting the deenergization of the electromagnets 186 and 201. The deenergization of the electromagnet 186 again causes the immediate steady energization of the horn signal 197. The deenergization of the electromagnet 201 precludes the butterfly-valve 214 from being moved into position to restrict the flow of motive fluid to the engine of the vehicle.

The speed of the vehicle is now increased to the last-mentioned excessive speed of 50 M. P. H., thus causing the operation of the gong 73 and the chime 115 in repeating cycles in the manner previously described. As soon as conditions permit, the operator of the vehicle will (a) restore the accelerator-pedal 146 to its idle position; (b) decrease the speed of the vehicle below 45 M. P. H.; and (c) manually operate the push-button switch 190.

The decrease in the speed of the vehicle to below 45 M. P. H. will discontinue the operation of the gong 73 and the chime 115. The restoration of the accelerator-pedal 146 to its idle position will again effect the deenergization of the electromagnets 128 and 133 in the manner previously described, thereby again permitting the operation of the push-button switch 190, to energize the electromagnet 186 for the purpose of deenergizing the horn signal 197 and energizing the electromagnet 201.

It may here again be assumed that the operator of the vehicle desires to restore the speed-alarm system to the conditions of operation which existed just prior to the energization of the electromagnet 151, which latter was caused by the operation of the vehicle at the excessive speed of 55 M. P. H. as previously described. The operator will now cause the vehicle to be stopped and will also reset the transmission-mechanism from its direct-drive position to its neutral position. Thereafter, the operator will manually operate the push-button 179 of the make-before-break switch 172 for the purpose of deenergizing the electromagnet 151, in the manner previously described. The operator now releases the push button 179 so that the latter reassumes its normal position.

From the foregoing, it will be seen that when the vehicle moved forwardly at speeds in excess of the present maximum unrestricted speed of 45 M. P. H., the alarm-signal was sounded by means of repeating cycles of operation of both the gong 73 and the chime 115. It will also be noted that it was necessary for the operator to restore the accelerator-pedal 146 to its idle position within the predetermined time-interval of one minute to prevent the steady energization of the horn signal 197.

It may now be assumed that the operator has again started the vehicle and has caused its speed to increase to 40 M. P. H., without, however, coincidentally causing excessive speed of the engine, thereby preventing the sounding of the gong 73, chime 115 and horn signal 197. Now that the vehicle is moving forwardly at 40 M. P. H., the operator decides that conditions are such that it is safe for him to have the vehicle move forwardly at speeds above the first critical speed of 45 M. P. H., but not in excess of the second critical speed of 60 M. P. H., without requiring that he be signaled as before described. This the operator may accomplish by manually shifting the switch-blade 102 (upper right portion of Fig. 1c) into engagement with its complemental contacts 101 and 104.

The shifting of the switch-blade 102 as above described short-circuits the resistor 91 of the energizing-circuit of the electric motor 51, with the result that the said motor operates at the upper of its two substantially-constant speeds, namely, in the present instance, 3000 R. P. M. The increased R. P. M. just referred to again causes the cam-head 46 to be rotated at 150 R. P. M., thereby serving to drive the cam-head 43 at this speed unless the speed of the engine or the speed of the vehicle drives the said cam-head 43 at speeds in excess of the said 150 R. P. M. The rotation of the cam-head 46 at 150 R. P. M. permits higher speeds of the engine relative to the speeds of the vehicle, and also permits speeds of travel of the vehicle not in excess of the second critical speed of 60 M. P. H. rather than not in excess of the first critical speed of 45 M. P. H., without causing the operation of the gong 73, chime 115 and horn signal 197. The maximum engine speeds at various speeds of the vehicle below which no signals are given, are those indicated in the chart of Fig. 7. By way of example, 2750 R. P. M. is the maximum engine speed when the vehicle is moving at 50 M. P. H. to insure that no signal will be given.

The shifting of the switch-blade 102 as above described also will effect the steady energization of the signal-lamp 106 for the purpose of indicating both inside and outside of the vehicle that the speed-alarm system is adjusted to permit the above-mentioned higher speeds of operation of the engine and the vehicle without causing signals to be given.

With the foregoing setting, let it now be assumed that the speed of the vehicle exceeds the newly-set unrestricted maximum speed of 60 M. P. H. As soon as this occurs, the speed of the vehicle-driven cam-head 43 will exceed that of the motor-driven cam-head 46, whereupon the said cam-head 43 will have axial movement imparted to it, with the result that the gong 73 and the chime 115 will be caused to operate in repeating cycles, which increase in frequency as the speed of the vehicle further increases over the said 60 M. P. H.

Having been warned by the operation of the gong 73 and the chime 115 as just described, the operator of the vehicle will permit the restoration of the accelerator-pedal 146 to its idle position within the predetermined time-interval of one minute, thereby preventing the energization of the horn signal 197 in the manner previously described.

Let it now be assumed that with the mechanism reset as previously described, the vehicle is caused to travel into a restricted-speed zone of the highway at the speed of 55 M. P. H. (above the first critical speed of 45 M. P. H. and below the second critical speed of 60 M. P. H.). Obviously, the speed-alarm system should have been reset to permit only the low speeds of the engine relative to the speeds of the vehicle, and also to permit speeds of travel of the vehicle not in excess of the first critical speed of 45 M. P. H. rather than not in excess of the second critical speed of 60 M. P. H., without causing the operation of the gong 73, chime 115 and horn signal 197.

For the purpose of overcoming the forgetfulness of the operator, the induction-coil 255 is provided, together with its rectifier 254 and connections. If the speed-restricted highway along which the vehicle is being driven is provided with a primary induction-coil suitably located and energized, it will induce in the induction-coil 255 an alternating current which will be rectified by the rectifier 254 into direct current. Direct current supplied by the rectifier 254 will energize the energizing-coil 250, thus magnetizing the core 248. The said core 248 when magnetized will attract both the armatures 96 and 244. The movement of the armature 244 will cause it to swing into engagement with the contact 245, thereby energizing the coil 249 and thus continuing the magnetization of the core 248. In addition to continuing the magnetization just referred to, the engagement of the armature 244 with the contact 245 will also have energized the signal-lamp 247. The energization of the signal-lamp 247 will indicate to the operator of the vehicle that he has entered a restricted-speed zone.

The described attraction of the armature 96 by the core 248 will have simultaneously disengaged it from the contact 97, thereby cutting out the short-circuiting of the resistor 91. The resistor 91 now having become fully effective, will now restore the electric motor 51 to the lower of its two substantially-constant speeds, namely, in the present instance, 2250 R. P. M. Under the conditions just described, the electric motor 51 will effect the rotation of the cam-head 46 at the lower of its two rates of speed, namely, 112.5 R. P. M. For purposes of convenience, let it be assumed that the speed of the vehicle is being maintained at the previously stated 55 M. P. H. (above the first critical speed of 45 M. P. H. and below the second critical speed of 60 M. P. H.), in which case, the cam-head 43 will be rotated in the manner previously described at the rate of 137.5 R. P. M. which is a rate corresponding to the R. P. M. of the driven gear 22, as is indicated in Fig. 6.

Under the conditions just above described, the cam-head 43 will be rotated at a rate of speed higher than that at which the cam-head 46 is being rotated by the electric motor 51, and the relative rotations between the two said cam-heads will again cause the cam-lugs 44—44 and the cam-lugs 45—45 to coact in such manner as to effect the axial movement of the cam-head 43 in repeating cycles. The axial movement of cam-head 43 will again effect the oscillation of the signal-control lever 66 thus causing the gong 73 and the chime 115 to give audible signals in the manner previously described. Under the present circumstances, the chime 115 will be intermittently energized 50 times per minute in accordance with the cycles of axial movement of the cam-head 43 to thus indicate the still excessive speed of the vehicle, namely, 55 M. P. H.

As previously described, the initial engagement of the contact 77 with its complemental contact 78 (as effected by the axial movement of the cam-head 43) will, in turn, effect the energization of the electromagnets 128 and 133, which energization will thereafter be steadily maintained by the locking-circuit which includes the armature 132 and contact 134. Here again, having been warned by the operation of the gong 73 and the chime 115 as just described, if the operator of the vehicle desires to prevent the steady energization of the horn signal 197, he will be required to (a) permit the accelerator-pedal 146 to return to its idle position within the previously-mentioned predetermined time-interval of one minute and (b) reduce the speed of the vehicle below 45 M. P. H.

It may now be assumed that the operator of the vehicle has carried out the requirements (a) and (b) just above referred to, and that the vehicle has come to the end of the speed-restricted section of the highway and has passed onto another section thereof where conditions permit the movement of the vehicle to the maximum unrestricted speed of 60 M. P. H. Under these conditions, the operator will desire to remove the speed restrictions imposed by the rotation of the shaft 50 of the electric motor 51 at its lower rate of speed of 2250 R. P. M. To remove these limitations, the operator momentarily pushes inwardly on the push-button 224 of the make-before-break switch 219 to thereby move the contact 225 thereof into engagement with the contact 226, and also move the contact 227 out of engagement with the contact 228.

The above-described engagement of the contact 225 with the contact 226 will effect the energization of the electromagnet 231 through the circuit which includes the elements 83, 229, 223, 226, 225, 221, 230 to 235 inclusive. The described energization of the electromagnet 231 will establish a locking-circuit which includes the armature 240 and the contact 241, thereby maintaining the steady energization of the electromagnet 231, signal-lamp 239 and heating-coil 236, after the operator has released the push-button 224.

The described energization of the signal-lamp 239 will serve to indicate both inside and outside of the vehicle that the alarm-system is adjusted for its maximum unrestricted speed of 60 M. P. H.

The described movement of the contact 227 out of engagement with the contact 228 will interrupt the energizing-circuit of the energizing-coil 249 to thus permit the armature 96 to be restored to engagement with the contact 97, and also permit the movement of the armature 244 out of engagement with its complemental contact 245. The described re-engagement of the armature 96 with the contact 97 will again short-circuit the resistor 91 of the energizing-circuit of the electric motor 51 to thus cause the latter to resume the higher of its two speeds (3000 R. P. M.) and thus effect the rotation of the cam-head 46 at its higher rate of 150 R. P. M. instead of its lower rate of 112.5 R. P. M. This higher rate of speed, as just described, will permit the unrestricted travel of the vehicle to the maximum speed of 60 M. P. H.

The last described energization of the heating-coil of 236 will effect the heating of the bimetallic switch-arm 233. The heating of the bimetallic switch-arm 233 for a time-interval of about two minutes will serve to distort the same out of engagement with the contact 234, thereby de-energizing the electromagnet 231 to thus permit the armature 240 to move out of engagement with the contact 241. The described movement of the armature 240 will, in turn, deenergize the signal-lamp 239 as well as the heating-coil 236. In due course, the bimetallic switch-arm 233 will cool and return to engagement with the contact 234 but at this particular time, the said closing will be ineffective inasmuch as the armature 240 will have moved out of engagement with the contact 241.

WHEN THE VEHICLE IS ASCENDING A GRADE

As previously described, the mercury switch 107 or its equivalent is designed and adapted to close the circuit through it when the vehicle is ascending a grade and for purposes of description, it may be assumed that the said mercury switch 107 does not close the circuit through it until the vehicle is climbing an appreciable grade such, for instance, as a 10% grade.

When the vehicle is sufficiently tilted to cause the mercury switch 107 to close the circuit through itself, the said switch will (assuming that, as is normal, the switch-blade 102 is out of engagement with its contact 101) short-circuit the resistor 91 of the energizing-circuit of the electric motor 51 thereby restoring the speed of the said motor to its second stage or maximum speed of 3000 R. P. M. The described increase in speed of the motor 51 will, under the present conditions, permit the engine to revolve at a much higher rate of speed than previously before the signaling-system will give a signal—all as indicated in Fig. 7.

WHEN THE VEHICLE IS MOVING DOWNGRADE

For the purpose of making clear the utility of the mercury switch 149 (upper right-hand portion of Fig. 1b), it may be assumed that the vehicle is descending a grade of sufficient slope which, in itself, would cause the vehicle to overspeed when the operator has thrown out the clutch of the vehicle and the accelerator-pedal 146 is in its idle position.

Under the conditions last above described, the down-tilt of the vehicle and descending the said grade will cause the mercury switch 149 to close the circuit through itself and thereby energize the electromagnets 128 and 133. The energization just referred to will cause the steady energization of the horn signal 197. The sounding of the horn signal 197 cannot, under the circumstances, be discontinued until the described down-tilt of the vehicle has changed to a level or lesser tilt such that the mercury switch 149 will open the circuit through it.

*The disclosure of Fig. 5*

The primary purpose of Fig. 5 is to illustrate an alternative form of time-delay control to be used in lieu of the bimetallic switch-arm 124 and its associated features.

Fig. 5 save as to the time-delay control corresponds to Fig. 1b, save as to the said bimetallic switch-arm and its associated features and the omission of the two flexible switch-arms 161 and 165 which are under the present circumstances no longer required and the fact that the make-before-break switch 172 has been omitted for lack of room.

The wire 123, instead of terminating at the bimetallic switch-arm 124 (the latter having been replaced), extends to the pivoted end of an armature 256 which is adapted to engage with the contact 125 at the adjacent end of the wire 167. The armature 256 is adapted to be moved into engagement with the contact 125 by an electromagnet 257.

The electromagnet 257 has one of its terminals connected by means of a wire 258 to one terminal of a battery 259 which has its opposite terminal grounded as shown.

Tapped into the wire 258 is a wire 260 leading to a contact 261 located adjacent the upper end of the electromagnet 128 previously described. The contact 261 is adapted to be engaged by the swinging end of a pivotal armature 262 which has been added adjacent the upper end of the electromagnet 128 in position to be attracted thereby simultaneously with the attraction of the armature 129. When the electromagnet 128 is not energized, the armature 262 engages with a contact 263 leading to ground.

As indicated in Fig. 5, the pivoted end of the armature 262 is connected by means of a wire 264 to ground but has interposed therein two resistors respectively designated by the reference characters 265 and 266 together with a condenser 267.

Connected to the wire 264 at a location intermediate the resistor 265 and the condenser 267 is a wire 268 having a resistor 269 interposed therein and leading to the control-grid of an electronic discharge-tube of the triode type and generally designated by the reference character 270. The electronic discharge-tube 270 is preferably of the vacuum type, though a gas-filled tube may be utilized for the same purpose.

Connected to the lower portion of the wire 123 previously described is a wire 271 leading to one terminal of the filament of the electronic discharge-tube 270—the opposite terminal of which filament is grounded as shown. A wire 272 serves to connect the plate of the tube 270 to the remaining terminal of the electromagnet 257 as is indicated in Fig. 5.

In the showing of Fig. 5, the flexible switch-arms 161 and 165 together with their respective contacts have been omitted as has also the right-hand portion of the wire 183. The wire 199, instead of being connected to the eliminated switch-arm 165 is connected to the wire 168 leading from the flexible switch-arm 157 to the electromagnet 151.

*The operation of the apparatus of Fig. 5 in conjunction with the apparatus of Figs. 1a, 1c, 2, 3 and 4*

As previously described, excessive speed of the vehicle and/or the engine thereof causes the cam-head 43 to rotate at speeds higher than the substantially constant-speed at which the cam-head 46 is being rotated by the electric motor 51. The described relative rotation between the cam-head 43 and the cam-head 46 will cause the cam-lugs 44—44 and cam-lugs 45—45 to coact to effect the axial movement of the cam-head 43 in repeating cycles.

Also as previously described, the initial axial movement of the cam-head 43 will effect the energization of the electromagnets 128 and 133, which will be steadily maintained by the locking-circuit which includes the contact 134 and the armature 132.

Under the conditions of operation now being described wherein the electronic form of time-delay control illustrated in Fig. 5 is being utilized in lieu of the bi-metallic switch-arm 124 and the heating-coil 126, the steady energization of the electromagnet 133 effects the steady energization of the filament of the electronic discharge-tube 270 and also effects the steady energization of the electromagnet 128. The energization of the electromagnet 128 moves the armature 262 out of engagement with the contact 263 and into engagement with the contact 261.

The engagement of the armature 262 with the contact 261 completes the electrical path including the resistors 265 and 266 through which a positive charge is applied from the battery 259 to the upper plate of the condenser 267. When the positive potential has increased sufficiently in the control-grid of the electronic discharge-tube 270, the current flow between the filament and the plate thereof will be increased to the value necessary to sufficiently energize the electromagnet 257 and cause the latter to move its complemental armature 256 into engagement with the contact 125. Preferably and under the circumstances here being described, the charging of the condenser 267 and the energization of the associated elements will be such that substantially one minute will elapse between the time when the upper plate of the said condenser first starts to receive the positive charge and the time that the electromagnet 257 is sufficiently energized to effect the above described movement of its complemental armature 256.

The engagement of the armature 256 with the contact 125 completes the energizing-circuit of the electromagnet 151 which has been previously described and is illustrated in the lower right portion of Fig. 5. The resulting energization of the electromagnet 151 will move the contact 155 into engagement with the contact 156 thereby steadily energizing the horn signal 197.

Restoration of the accelerator-pedal 146 to its idle position moves the contact 138 out of engagement with the contact 139 thus effecting the deenergization of the electromagnets 128 and 133 as previously described and under the present conditions also effects the deenergization of the filament of the electronic discharge-tube 270. deenergization of the electromagnet 128 permits the movement of the armature 262 out of engagement with the contact 261 and into engagement with the contact 263. By this action, the armature 256 will be moved out of engagement with the contact 125 and the condenser 267 will be discharged through the resistor 265.

*The disclosure of Figs. 8, 9, 10 and 11*

The primary purpose of Figs. 8, 9, 10 and 11 is to illustrate another embodiment of mechanism to be utilized in lieu of the cam-head 43, the cam-head 46 and associated elements for translating rotation of the driven bevel gear 22 into the operation of the switch-arms 75 and 79 and also the operation of the striker-arm 70 and its associated parts. The mechanism illustrated in Fig. 8 also includes additional apparatus for permitting higher speeds of operation of the engine in relationship to speeds of travel of the vehicle when the transmission-mechanism thereof is in its second-speed position.

Figure 8:
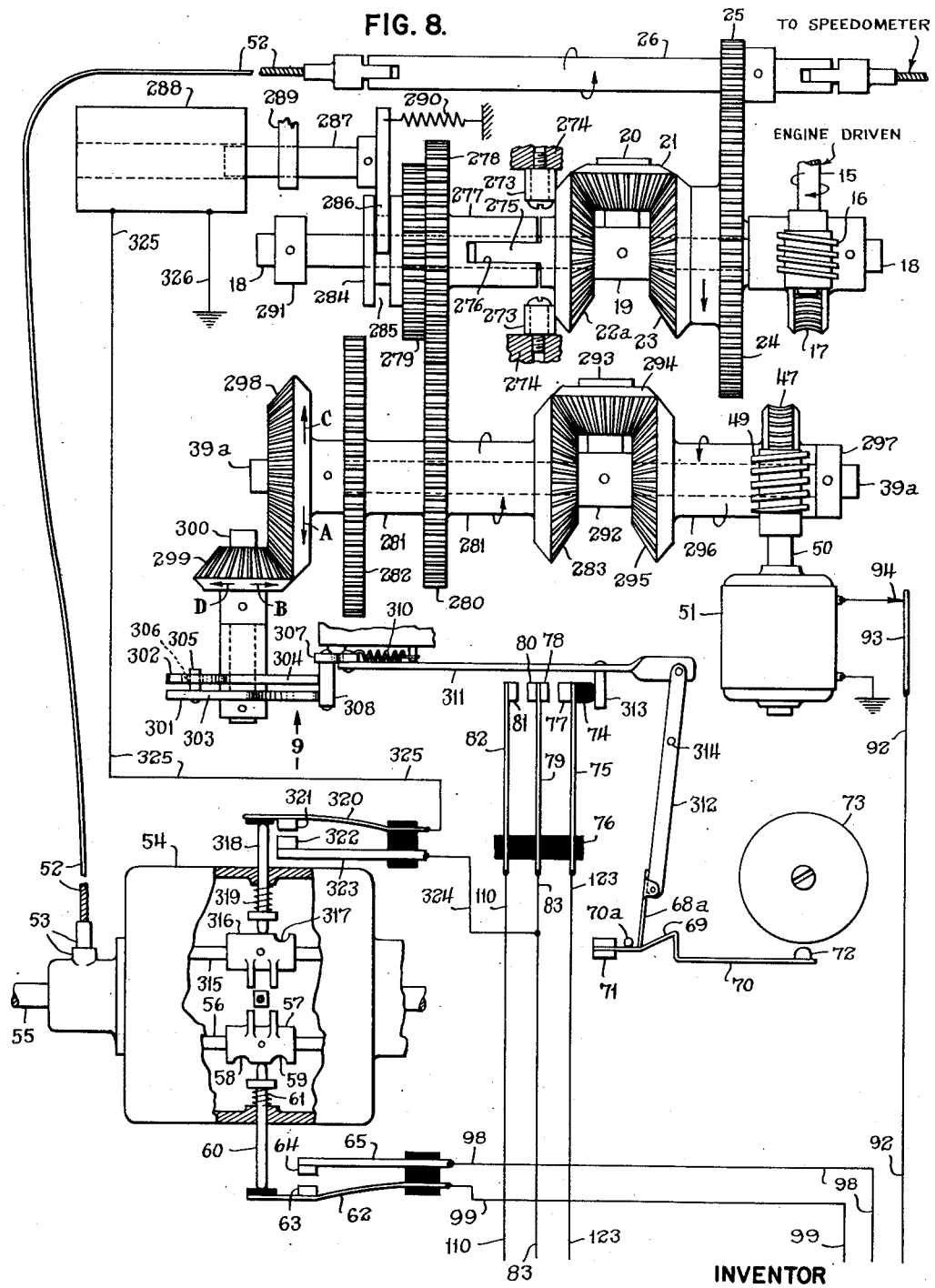

The elements of Fig. 1a which are again illustrated in Fig 8 are designated by similar reference characters.

As previously described in connection with the disclosure of Fig. 1a, the engine-driven shaft 15 has rigidly coupled thereto a worm 16 meshing into and driving a worm-wheel 17 which is pinned or otherwise rigidly attached to a shaft 18. The shaft 18 has rigidly attached to it a hub 19 rigidly carrying a radially-projecting stud 20 upon which latter is mounted with freedom for rotation a bevel gear 21.

The bevel gear 21 meshes into the previously described bevel gear 23 and also into a bevel gear 22a similar to the bevel gear 22 but having a different form of hub. The said bevel gears 23 and 22a are respectively mounted on opposite sides of the hub 19 upon the shaft 18 but with freedom for rotation with respect thereto. The bevel gear 22a is maintained in meshed relationship with the bevel gear 21 by rollers 273—273 which latter are mounted on stationary supports 274—274.

The bevel gear 22a just referred to is provided with a rigid coupling-finger 275 which latter projects with sliding-fit into a coupling-notch 276 formed in the inner end of an inwardly-projecting hub 277 of a spur-gear 278 and a spur-gear 279 unitary with the latter.

The spur-gear 278 normally meshes with a spur-gear 280 formed on the central portion of a hub 281 which latter is also formed with a spur-gear 282 and a bevel gear 283.

A shifting-collar 284 is formed as a unit with the spur-gears 278 and 279 and is provided with an annular groove 285 into which projects a shifting-fork 286 rigidly secured on the outer end of a plunger 287. The plunger 287 is preferably formed of mild steel and projects into the adjacent end of a solenoid 288, so as to act as a movable core therefor. The said plunger is mounted for axial reciprocation in a stationary guide 289.

The left end of a spring 290 is attached to the shifting-fork 286 as shown in Fig. 8 for the purpose of yieldingly maintaining the spur-gear 278 in mesh with the spur-gear 280 when the solenoid 288 is unenergized. When the solenoid 288 is energized in the manner as will be hereinafter described, the spur-gear 278 will be moved out of mesh with the spur-gear 280 and coincidentally the spur-gear 279 will be moved into mesh with the spur-gear 282. A collar 291 is rigidly secured on the left end of the shaft 18 for the purpose of limiting the axial movement of the spur-gears 278 and 279 when the latter are moved to the left by the solenoid 288.

The spur-gears 280 and 282 and the bevel gear 283 together with their hub 281, are mounted with freedom for joint relative rotation upon a shaft 39a. The shaft 39a has rigidly secured thereon a hub 292 rigidly carrying a radially-projecting stud 293 upon which latter is mounted with freedom for rotation a bevel gear 294. The bevel gear 294 meshes into the previously described bevel gear 283 and also into a bevel gear 295 which latter is mounted to the right of the hub 292 upon the shaft 39a with freedom for rotation with respect to the latter.

The bevel gear 295 is unitary with a hub 296 which rigidly carries the worm-wheel 47. The hub 296 is mounted with freedom for relative rotation upon the shaft 39a and is maintained in position thereon by a collar 297. As previously described in connection with the disclosure of Fig. 1a, the worm-wheel 47 meshes with and is driven by the worm 49 rigidly mounted upon the shaft 50 of the electric motor 51.

A bevel gear 298 is rigidly secured on the left portion of the shaft 39a and meshes with and drives a bevel gear 299 rigidly secured on the upper end of a shaft 300. The shaft 300 also has a control-cam 301 rigidly secured thereon. A second control-cam 302 is mounted on the shaft 300 intermediate the bevel gear 299 and the control-cam 301 but with freedom for limited turning movement with respect to the other elements just mentioned. The control-cam 301 is formed on its periphery with diametrically-opposite cam-lobes 303—303. The control-cam 302 is also formed on its periphery with diametrically-opposite cam-lobes 304—304 which have a circumferential extent sufficient to span the gaps between the cam-lobes 303—303 of the control-cam 301 under conditions as will hereinafter appear. A stud 305 is rigidly secured to the control-cam 301 and projects into a curved clearance-slot 306 formed in the control-cam 302. The control-cam 301 rotates relative to the control-cam 302 and the former also drives the latter in the manner as will be hereinafter described.

Figure 9:
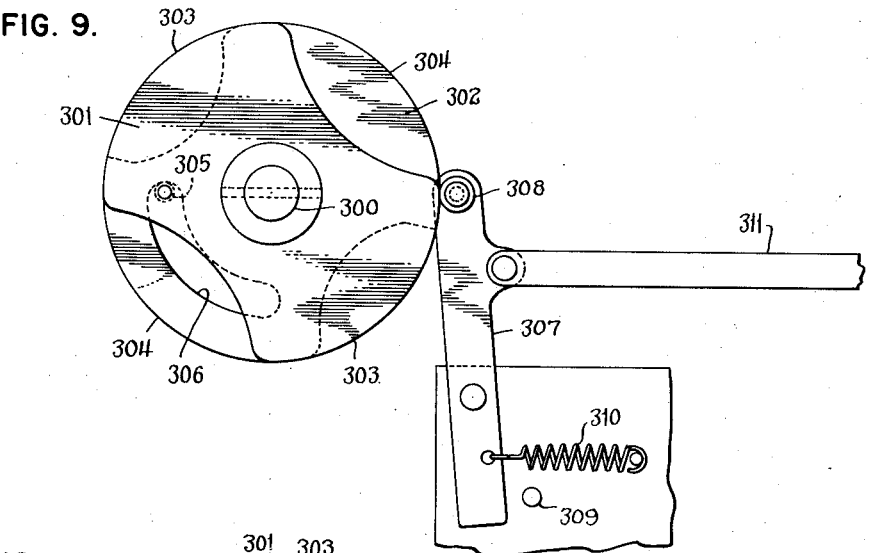
Fig. 9 is a detail elevational view of the control-cam and associated parts on a larger scale and looking in the direction of the arrow 9 in Fig. 8.
Figure 10:
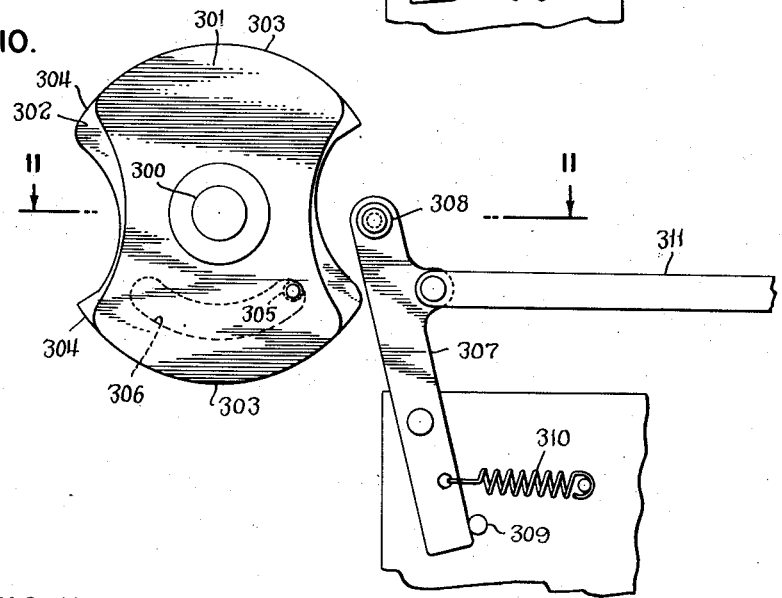
Fig. 10 is a view similar to Fig. 9 but showing one of the control-cams moved about one-quarter turn with respect to the other.

A lever 307 provided with a roller 308 is mounted for pivotal movement intermediate its respective opposite ends as shown in Figs. 9 and 10. The movement of the said lever is controlled by the control-cams 301 and 302 and is limited in its swinging movement by stop-pin 309. A spring 310 yieldingly urges the roller 308 of the lever 307 toward the control-cams 301 and 302. A link 311 has its left end (Figs. 9 and 10) pivotally attached to the lever 307 and has its opposite end similarly attached to a signal-control lever 312.

The link 311 has a stud 313 rigidly secured thereto and positioned to engage with the insulating-finger 74 mounted at the upper end of the previously described flexible switch-arm 75.

The signal-control lever 312 is mounted for pivotal movement intermediate its respective opposite ends upon a pivot-pin 314. Below its pivot-pin 314 the lever 312 has, in turn, pivoted thereto the previously-described actuating-finger 68a which has its lower end normally engaged with the inclined cam-surface 69 of the spring-metal striker-arm 70.

The transmission-mechanism, in addition to the features described in connection with Fig. 1a also has mounted therein with capacity for reciprocation a rod 315 carrying a gearshifting-slide 316 forming a usual feature of an automobile transmission and constituting the second-speed and direct drive or high-gear slide thereof.

The gearshifting-slide 316 above referred to is modified inasmuch as it is provided adjacent its forward end with a second-speed notch 317. Mounted for reciprocation in the left side wall of the gearshift-housing 54 is an actuating-rod 318 having its inner end rounded and held in engagement with the gearshifting-slide 316 by means of a helical spring 319. The projecting outer end of the actuating-rod 318 engages with a flexible switch-arm 320 carrying a contact 321 adapted to engage with a fixed contact 322 under the inherent tension of the switch-arm 320 when the gearshifting-slide 316 is moved into its second-speed position. The contact 322 is mounted at the outer end of a relatively-rigid switch-arm 323 as is shown in the lower left portion of Fig. 8.

The switch-arm 323 is connected by means of a wire 324 to the wire 83 which interconnects one terminal of the storage battery 84 (Fig. 1c) and the flexible switch-arm 79. The switch-arm 320 is connected by means of a wire 325 to one terminal of the solenoid 288. The remaining terminal of the solenoid 288 is connected by means of a wire 326 to ground as is shown in the upper left portion of Fig. 8.

*The operation of the apparatus of Figs. 8, 9 10 and 11 in conjunction with the apparatus of Figs. 1b and 1c*

WHEN THE VEHICLE IS AT A STANDSTILL

For purposes of making clear the operation of the automatic speed-alarm system employing the showing of Figs. 8, 9 and 10 in lieu of the showing of Figs. 1a, 2, 3 and 4 but in conjunction with Figs. 1b and 1c, it is convenient to first assume that the automobile or other vehicle with which the system is associated is at a standstill and is not inclined sufficiently to permit the mercury of the mercury switch 107 to engage with the upper contact thereof. It may further be assumed that the operator of the vehicle has manually operated the switch-blade 86 into engagement with the complemental contacts 87 and 88 and also that the switch-blade 93 is in engagement with its complemental contact 94. Still further, it may be assumed that the transmission-mechanism of the vehicle is in the "neutral" position and the switch-blade 102 is out of engagement with its complemental contacts 101 and 104.

Under the conditions just above described, the electric motor 51 will again be energized through the circuit which includes the elements 84, 83, 85, 86, 88, 90, 91, 92, 93 and 94. The electric motor 51, for example, may again be assumed to be constructed to rotate its shaft 50 at 3000 R. P. M. when a potential difference of six volts is applied to its terminals. The resistor 91, which forms an element of the circuit just described may provide a voltage drop which causes the electric motor 51 to rotate its shaft 50 at 2250 R. P. M., when in series with the said electric motor, as it is under the conditions here assumed for the purposes of description. Further, it is necessary that the electric motor 51 as utilized in the present embodiment of the invention be constructed to rotate its shaft 50 in the opposite direction to that required in the embodiment of the control apparatus illustrated in Fig. 1a.

The rotation of the shaft 50 of the electric motor 51 at 2250 R. P. M. will similarly rotate the worm 49 which, in turn, will rotate the worm-wheel 47 and the unitary bevel gear 295 at 112.5 R. P. M.

It may now be assumed that the engine of the automobile or other vehicle is revolving at 1000 R. P. M. and hence below the pre-selected critical speed of 1125 R. P. M. as shown in the chart of Fig. 6. The bodily rotation of the bevel gear 21 will thus be effected at 50 R. P. M. through the intermediary of the shaft 15, worm 16, worm-wheel 17 and shaft 18. The bevel gear 22a, spur-gear 278 and spur-gear 279 will be rotated at twice the rate (i. e., 100 R. P. M.) of the bodily rotation of the bevel gear 21 and in the same direction, since at this time the bevel gear 23 will not be rotated in relationship to forward and rearward travel of the vehicle which latter is at a standstill under the conditions now being described.

The rotation of the spur-gear 278 as above described effects rotation of the spur-gear 280, spur-gear 282 and bevel gear 283 at 100 R. P. M. in the direction indicated in Fig. 8. The rotation of the bevel gear 283 at 100 R. P. M. and the rotation of the bevel gear 295 at 112.5 R. P. M. in the direction opposite to the direction of rotation of the bevel gear 283 will effect bodily movement of the bevel gear 294 at 6.25 R. P. M. in the direction corresponding to the direction of rotation of the bevel gear 295.

The bodily rotation of the bevel gear 294 at 6.25 R. P. M. as just above described will effect the similar rate and direction of rotation (arrow A of Fig. 8) of the bevel gear 298 which, in turn, will effect rotation of the bevel gear 299, shaft 300 and control-cam 301 at 12.5 R. P. M. in the direction of the arrow B of Fig. 8.

The rotation of the control-cam 301 as just above described will serve to drive the control-cam 302 in the same direction. This latter drive will be effected through the intermediary of the stud 305 of the control-cam 301 contacting the clockwise end of the clearance-slot 306 in the control-cam 302, as is especially well indicated in Fig. 9. By reference to Fig. 9 it will be observed that the respective cam-lobes 303—303 of the control-cam 301 span the gaps between the cam-lobes 304—304 of the control-cam 302 so that, in effect, the peripheries of the two pairs of cam-lobes 303—303 and 304—304 together form a continuous concentric surface upon which the roller 308 rides, with the result that the lever 307 and the parts associated therewith are not caused to oscillate, as the two said control-cams rotate under the present conditions. Under the conditions just described, the alarm-means 73, 115 and 197 will not be caused to function.

Let it now be assumed that the speed of the engine of the vehicle is caused to speed up to 1375 R. P. M., and thus in excess of the aforesaid critical speed of 1125 R. P. M. Under these conditions, the bevel gear 298 will be caused to rotate at 12.5 R. P. M. in the direction of the arrow C of Fig. 8, thus causing the bevel gear 299 to rotate in the direction of the arrow D of Fig. 8 at 25 R. P. M. Inasmuch as the control-cam 301 is rigidly coupled by the shaft 300 to the bevel gear 299, it will be caused to rotate in the same direction and at the same 25 R. P. M. The turning of the control-cam 301 as just described will cause the stud 305 carried thereby to ride through the clearance-slot 306 until it engages with the counterclockwise end thereof, whereupon it will pick-up and drive the said control-cam 302, so that the parts assume the positions in which they are shown in Figs. 10 and 11.

Figure 11:
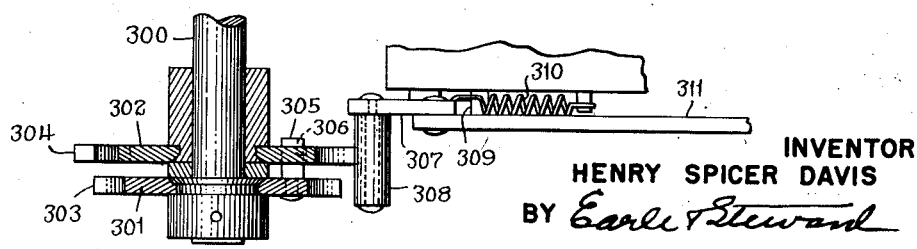
Fig. 11 is a sectional view taken on the line 11—11 of Fig. 10.

With the parts in the positions in which they are shown in Figs. 10 and 11, it will be noted that the cam-lobes 303—303 are in substantial registry with the similar cam-lobes 304—304 of the cam 302 so that the roller 308 instead of riding upon a continuous circular periphery, will now be caused to oscillate back and forth two complete cycles for each complete joint revolution of the control-cams 301 and 302. Inasmuch as the roller 308 is carried by the lever 307, the said lever will be caused to oscillate in the same manner and at the same rate, i. e., 50 complete cycles of oscillation per minute.

The oscillatory movement of the lever 307 will similarly oscillate the signal-control lever 312 through the intermediary of the link 311, which latter will reciprocate back and forth. The described movement of the signal-control lever 312 will cause the striker 72 to strike the gong 73 in corresponding repeating cycles at the rate of fifty strokes per minute, to thus sound the signal. The movement to the left of the link 311 will cause its stud 313 to flex the switch-arm 75 toward the switch-arm 79 and ultimately will cause the latter to flex toward the switch-arm 82. This action will engage the contacts 77—78 and 80—81, with the result that electrical energy will be supplied to both the chime 115 and the heating-coils 122—122, in the manner described in connection with the description of Figs. 1a to 4 inclusive. The result will be that the chime 115 will be caused to sound and ultimately as the heating coils 122—122 become heated, the said chime will be cut out of action in the manner previously described in connection with the description of Figs. 1a to 4 inclusive.

It will be understood that the above-described cycle of operation occurs for each complete cycle of oscillatory movement of the lever 307 as effected by the rotation of the control-cams 301 and 302. Under the conditions here being described with the engine turning at 1375 R. P. M. (the vehicle being at a standstill), the chime 115 will be sounded at the rate of fifty times per minute.

Assuming that the operator of the vehicle is still maintaining the depression of the accelerator-pedal 146 to maintain the engine operating at the aforesaid 1375 R. P. M., the contact 138 will remain in engagement with its complemental contact 139 so that initial engagement of the contact 77 with the contact 78 will effect the energization of the electromagnets 128 and 133. Thereafter, a steady energization of the electromagnets 128 and 133 will be maintained through the locking-circuit controlled by the said electromagnet 133, in the manner previously described. The steady energization of the electromagnet 128 will maintain the armature 129 out of engagement with the contact 130 for purposes as will hereinafter appear.

Coincidentally with the energization of the electromagnets 128 and 133 as above described, the heating-coil 126 will be energized to thus cause the bimetallic switch-arm 124 to engage with the contact 125, thereby completing the circuit to the electromagnet 151, in the event that the operator of the vehicle has not previously restored the accelerator-pedal 146 to its idle position within the predetermined time-interval of one minute.

The resulting energization of the electromagnet 151 will move the contact 155 into engagement with the contact 156 which, in turn, will flex the switch-arm 157, thereby also moving the contact 158 out of engagement with the contact 159. This operation establishes a locking-circuit for maintaining the energization of the electromagnet 151 in the manner previously described in connection with the description of the apparatus of Figs. 1a to 4 inclusive.

The above-described energization of the electromagnet 151 will also cause the contact 163 to move into engagement with the contact 164 for the purpose of continuously (rather than intermittently) energizing the electric horn signal 197. In this connection, it will readily be understood that while the horn signal 197 is continuously energized for a very definite purpose, its continued operation cannot be tolerated for long by those within hearing. As soon as possible, the operator of the vehicle will be practically forced to restore the accelerator-pedal 146 to its idle position and to manually operate the push-button switch 190. The restoration of the accelerator-pedal 146 to its idle position will effect the deenergization of the electromagnets 128 and 133. This deenergization of the electromagnet 128 will permit the armature 129 to be restored into engagement with the contact 130, thereby permitting the operation of the push-button switch 190 to, in turn, energize the electromagnet 186. The described energization of the electromagnet 186 will establish a locking-circuit for the continued energization thereof, in the manner previously described in connection with the preceding figures of the drawings. The steady energization of the electromagnet 186 as just above described, will move the armature 187 out of engagement with the contact 194 and into engagement with the contact 195, thereby deenergizing the horn signal 197 and coincidentally energizing the electromagnet 201. The energization of the electromagnet 201 will attract the armature 202 and thereby cause the valve-plug 203 to close the vent-opening 205 of the valve-housing 204.

The described closing of the vent-opening 205 will increase the condition so that, under proper circumstances, the vacuum on the left side of the flexible diaphragm 210 may be increased. In this connection, it will be readily understood that an increase in the speed of the engine of the vehicle will increase the degree of vacuum, and hence when a predetermined speed of the said engine is reached, the opposing urge of the spring 218 will be overcome and the diaphragm 210 will be moved to the left, as viewed in Fig. 1c. The described movement of the diaphragm 210 will effect the movement of the butterfly-valve 214 to thereby restrict the passage of motive-fluid through the governor-housing 212 and thereby reduce the speed of the engine of the vehicle automatically.

As a logical next step, the operator of the vehicle will prepare to start the same and will shift the transmission-mechanism into its first-speed position. The resulting movement of the gearshifting-slide 57 will permit the actuating-rod 60 to move inwardly in the transmission-housing 54 and into the first-speed notch 58. This action will permit the flexible switch-arm 62 to move its contact 63 into engagement with the complemental contact 64 and thereby short circuit the resistor 91 of the energizing-circuit of the electric motor 51, in a manner as previously described in connection with the operation of the motor as illustrated in Figs. 1a to 4 inclusive.

Now that the resistor 91 is short-circuited and thus rendered inoperative, the total voltage of the storage battery 84 will be applied to the terminals of the electric motor 51, thereby effecting the rotation of its shaft 50 at the maximum predetermined rate of 3000 R. P. M., instead of the rate of 2250 R. P. M., as was the case under the conditions previously described. The rotation of the shaft 50 at this new rate of 3000 R. P. M. will effect the rotation of the worm-wheel 47 and its unitary bevel gear 295 at 150 R. P. M.

The described rotation of the bevel gear 295 at its new rate will permit the bevel gear 283 to be rotated by the engine of the vehicle at a rate higher than previously, but not exceeding 150 R. P. M. without effecting the bodily rotation of the bevel gear 294 in the direction corresponding to the direction of rotation of the bevel gear 283. The vehicle being at a standstill, the speed of the engine thereof may rise as high as 1500 R. P. M. under the present conditions instead of the previously described 1125 R. P. M. before sounding a signal or alarm. This is due to the fact that when the resistor 91 was included as an element of the energizing-circuit of the electric motor 51, the speed which needed to be exceeded to effect a signal was only 1125 R. P. M. As is indicated in the chart of Fig. 7, the rotation of the engine of the vehicle at 1500 R. P. M. will effect the bodily rotation of the bevel gear 21 at 75 R. P. M.

Let it now be assumed that while the vehicle is still at rest the engine thereof is caused to exceed the 1500 R. P. M. above referred to. Under such conditions the bevel gear 283 will again be caused to exceed the speed of rotation of the bevel gear 295 to thereby again effect the bodily rotation of the bevel gear 294 in the direction corresponding to the direction of rotation of the bevel gear 283.

Now, inasmuch as the bevel gear 283 is being rotated by the engine at a speed higher than that at which the bevel gear 295 is being rotated by the electric motor 51, the bevel gear 298 will be caused to rotate in the direction of the arrow C of Fig. 8, thus causing the bevel gear 299 to rotate in the direction of the arrow D of Fig. 8. Inasmuch as the control-cam 301 is rigidly coupled to the bevel gear 299 as before described, it will be caused to rotate in the same direction. The turning of the control-cam 301 as just described will cause the stud 305 carried thereby to ride through the clearance-slot 306 until it engages with the counter-clockwise end thereof, whereupon it will pick up and drive the control-cam 302 so that the said control-cams are again brought into the relative positions in which they are shown in Figs. 10 and 11. This rearrangement of the control-cams 301 and 302 will again cause the parts 307, 308, 311 and 312 to move in repeating cycles, thereby alternately engaging and disengaging the contacts 77—78 and 80—81 and vibrating the striker-arm 70. The initial engagement of the contact 77 with the contact 78 as just above described will cause the energization of the electromagnets 128 and 133, which energization will be maintained by the locking-circuit, which includes the armature 132 and contact 134.

The described energization of the electromagnet 128 will deenergize the electromagnet 186, which latter will open its locking circuit and permit the armature 187 to move out of engagement with the contact 195 and into engagement with the contact 194, thus, in turn, deenergizing the electromagnet 201. The deenergization of the electromagnet 201 will preclude the movement of the butterfly-valve 214 into position to restrict the flow of motive fluid to the engine of the vehicle. The engagement of the armature 187 with the contact 194 will again effect the steady energization of the horn signal 197.

Under the conditions just above described, the gong 73, chime 115 and horn signal 197 will all be operating simultaneously, so that the operator of the vehicle will be warned of the necessity to reduce the speed of the engine.

The operator will now permit the accelerator-pedal 146 to return to its idle position, whereupon the engine will slow down sufficiently to permit the control-cams 301 and 302 to reassume the relationships in which they are shown in Figs. 8 and 9, thereby stopping the sounding of the gong 73 and the chime 115. The horn signal 197 must now be stopped and inasmuch as the accelerator-pedal 146 is now in its idle position, the manual operation of the push-button switch 190 will be effective to energize the electromagnets 186 and 201, to thus cut off the supply of energy to the horn signal 197 and also cause the valve-plug 203 to close the vent-opening 205 of the valve housing 204.

It is to be borne in mind that despite the stopping of the sounding of the gong 73, the chime 115 and the horn signal 197, nevertheless, the system is not yet restored to the condition in which it was in prior to the engine having been over-speeded as described. Under these conditions, the electromagnet 151 will have remained energized due to the locking-circuit in which it is located, as has been previously described.

The operator will now wish to restore the speed-alarm system to the conditions which existed previously to the over-speeding of the engine as described and may now manually press the push-button 179 of the make-before-break switch 172, which will result in the momentary re-energization of the horn signal 197 and the deenergization of the electromagnet 151, which latter will result in the restoration of the flexible switch-arms 154, 157 and 161 to their normal positions, as indicated in Fig. 1b. The operator will promptly release the push-button 179 so that the horn signal 197 ceases to sound.

WHEN THE VEHICLE IS MOVING FORWARD

It may now be assumed that the transmission-mechanism of the vehicle is still in its first-speed position and that the vehicle is moving forwardly at a rate of, for example, 10 M. P. H. This forward movement of the vehicle will cause the vehicle-driven shaft 26 to be rotated in the direction indicated in Fig. 8, together with the spur-pinion 25. The spur-pinion 25 will serve to turn the spur-gear 24 and hence also the bevel gear 23.

Under the conditions just above described and as long as the engine does not exceed 1750 R. P. M. (which it will not unless the clutch slips), the electric motor 51 will continue to cause the bodily rotation of the bevel gear 294 in the direction corresponding to the direction of rotation of the bevel gear 295. This, in turn, will cause the control-cam 302 to assume the relationship with respect to the control-cam 301 shown in Figs. 8 and 9, with the result that the roller 308 will ride on a substantially-continuous circular surface and no movement of the lever 307 and its connecting parts will be effected.

It may now be assumed that for some reason or other, the clutch is slipping so that the engine speeds up to 2000 R. P. M. while the forward speed of the vehicle remains at 10 M. P. H., thus causing a disproportionately high engine speed as compared to the speed of the vehicle. Under the conditions just referred to, the bevel gear 21 will be bodily rotated around the shaft 18 at 100 R. P. M. Now, inasmuch as the forward movement of the vehicle (10 M. P. H.) is only causing the bevel gear 23 to rotate at a rate of 25 R. P. M. (as indicated in the chart of Fig. 7), the described bodily rotation of the bevel gear 21 will result.

The described rotation of the bevel gear 21 (at 100 R. P. M.) combined with the rotation of the bevel gear 23 (at 25 R. P. M.) will cause the bevel gear 22a to be rotated in the same direction at the rate of 175 R. P. M. This will result in the spur-gear 278 being rotated in unison with the bevel gear 22a, thereby effecting the rotation of the spur-gear 280, spur-gear 282 and bevel gear 283 also at 175 R. P. M. and in the direction indicated in Fig. 8. The rotation of the bevel gear 283 at the said speed of 175 R. P. M. and the rotation of the bevel gear 295 at 150 R. P. M., under the urge of the electric motor 51, in the direction opposite to the direction of rotation of the bevel gear 283, will effect the bodily rotation of the bevel gear 294 at 12.5 R. P. M. and in the same direction as the direction of rotation of the bevel gear 283.

Under the foregoing conditions, the control-cams 301 and 302 will have reassumed the positions in which they are shown in Figs. 10 and 11 and will be jointly rotating at 25 R. P. M. The lever 307 will now be caused to oscillate in repeating cycles at the rate of fifty oscillations per minute.

The described oscillation of the lever 307 will cause the chime 115 and the gong 73 to sound at the rate of fifty strokes per minute, thus indicating to the operator that the engine of the vehicle is operating at the excessive speed of 2000 R. P. M., while the vehicle itself is moving forwardly only at 10 M. P. H. Under these conditions, having been warned by the sounding of the chime 115 and the gong 73 as just described, the operator of the vehicle will permit the restoration of the accelerator-pedal 146 to its idle position within the previously-mentioned predetermined time-interval of one minute, thereby preventing the steady energization of the horn signal 197 in the manner previously described.

It may now be assumed that the transmission-mechanism of the vehicle is reset into its second-speed position. To effect this resetting, the gearshifting-slide 57 will necessarily have to have been restored to its intermediate or neutral position before the gearshifting-slide 316 could have been shifted into its second-speed position. The movement of the gearshifting-slide 57 into its neutral position as an incident to moving into second gear, will cause the contact 63 to be moved out of engagement with its complemental contact 64, thus removing the previously-existing short-circuit of the resistor 91 through which the electric motor 51 is energized. The electric motor 51 will now be restored to its lower speed of rotation of 2250 R. P. M., thus lowering the speed of the bevel gear 295 to 112.5 R. P. M.

The resetting of the transmission-mechanism into its second-speed position will also permit the contact 321 to engage with its complemental contact 322, thereby energizing the solenoid 288.

The energization of the solenoid 288 as just described will cause the plunger 287 to be moved to the left in opposition to the tension of the spring 290 and thereby move the spur-gear 278 out of mesh with the spur-gear 280, while at the same time moving the spur-gear 279 into mesh with the spur-gear 282. This action will cause the bevel gear 283 to now rotate in a lower speed-range than it previously did before the energization of the solenoid 288. Inasmuch as under the present circumstances the bevel gear 283 will be rotated at lower speeds relative to the speeds of rotation of the bevel gear 22a, higher engine speeds will be permitted relative to vehicle speeds before a signal is given. For example, the operation of the alarm-means 73, 115 and 197 will not be effected when the vehicle is moving forwardly at 15 M. P. H. until such time as the engine speed exceeds 1781.25 R. P. M.

It may now be assumed that the transmission-mechanism is again reset, but this time into its high-speed or direct-drive position. By this action, the contact 321 will be moved out of engagement with its complemental contact 322 and maintained in such disengaged position, thereby deenergizing the solenoid 288. This deenergization will permit the spring 290 to reassert itself and coincidentally disengage the spur-gear 279 from the spur-gear 282 and re-engage the spur-gear 278 with the spur-gear 280, thus restoring the said parts to the positions in which they are indicated in Fig. 8.

Now that the transmission-mechanism is in its high-speed or direct-drive position, the increasing speed of the engine, as it increases the forward speed of the vehicle, will not effect the operation of the signal-means 73, 115 or 197 until such time as the speed of the vehicle exceeds 45 M. P. H.

It may now be assumed that the engine is caused to operate at 2750 R. P. M., thereby causing the vehicle to travel at 55 M. P. H., as is indicated in the chart of Fig. 6. Under these conditions, the bevel gear 21 will be bodily rotated around the shaft 18 at 137.5 R. P. M., while the bevel gear 23 is also rotated at 137.5 R. P. M. The described bodily rotation of the bevel gear 21 at 137.5 R. P. M. will, when combined with the rotation of the bevel gear 23 at the same speed of 137.5 R. P. M., cause the bevel gear 22a to be rotated in the same direction and at the same rate of 137.5 R. P. M. The spur-gear 278 will, under these conditions, be rotating in unison with the bevel gear 22a and thereby effects the rotation of the spur-gear 280, spur-gear 282 and bevel gear 283 at 137.5 R. P. M. in the direction indicated in Fig. 8. The rotation of the bevel gear 283 (137.5 R. P. M.) combined with the rotation of the bevel gear 295 (112.5 R. P. M.) under the urge of the electric motor 51 and in the direction opposite to the direction of rotation of the bevel gear 283, will effect the bodily rotation of the bevel gear 294 at 12.5 R. P. M. in the direction corresponding to the direction of rotation of the said bevel gear 283.

Under the foregoing conditions, the control-cams 301 and 302 will assume the positions in which they are shown in Figs. 10 and 11, and be jointly rotated at 25 R. P. M., thereby causing the oscillatory movement of the lever 307 and the movement of the parts connected thereto, in repeating cycles at the rate of fifty operations per minute.

The gong 73 and chime 115 will under the conditions just above described be caused to operate at the aforesaid rate of fifty cycles per minute, thus indicating to the operator that the engine is being operated at speeds of 2750 R. P. M., while the vehicle is moving forwardly at a speed of 55 M. P. H. Having thus been warned, the operator of the vehicle will remove pressure from the accelerator-pedal 146 and thereby permit the same to move into its idle position. Now, with the result that both the engine and the vehicle will slow down and as soon as the speed of the vehicle has fallen below 45 M. P. H. (for corresponding engine speed of 2250 R. P. M.), the gong 73 and chime 115 will cease to sound, for reasons as have been hereinbefore explained. It may here be noted, however, that should the operator of the vehicle fail to release the accelerator-pedal within the predetermined time-interval of one minute after the sounding of both the gong 73 and the chime 115, the signal horn 197 would have been steadily energized, until such time as the operator manually operated the push-button switch 190.

After the foregoing occurrences, conditions may be such that the operator finds that it is safe for him to have the vehicle moved forwardly at speeds in excess of 45 M. P. H. without requiring that signals be given as before described. The operator may accomplish this by manually shifting the switch-blade 102 (upper right portion of Fig. 1c) into engagement with its complemental contacts 101 and 104, and in this manner permit higher speeds of operation of the engine and hence higher speeds of travel of the vehicle without bringing the gong 73 or the chime 115 into operation.

The above-described manual shifting of the switch-blade 102 will cause the steady energization of the signal-lamp 106 to thereby indicate both inside and outside of the vehicle that the alarm or signal system is adjusted to operate at engine speeds in excess of 3000 R. P. M. and hence at vehicle speeds in excess of 60 M. P. H. when the transmission-mechanism is in direct-drive setting. The shifting of the switch-blade 102 as above described permits the above-stated higher speed of operation without the giving of a signal or alarm, by its effect in short-circuiting the resistor 91 of the energizing-circuit of the electric motor 51, thus causing the said motor to operate at the higher of its two substantially-constant speeds, namely, in the present instance, 3000 R. P. M. The electric motor 51 will now rotate the bevel gear 295 at its maximum predetermined speed of 150 R. P. M., instead of at the previous rate of 112.5 R. P. M.

With the above-described resetting of the parts to permit vehicle speeds in excess of 45 M. P. H. and engine speeds in excess of 2250 R. P. M., it may be assumed that the operator causes the vehicle to exceed the newly-set maximum vehicle speed of 60 M. P. H. and engine speed of 3000 R. P. M. If this occurs, the gong 73 and the chime 115 will be caused to again go into operation, and if the excess speed is not corrected within the predetermined time-interval of one minute, the signal horn 197 will also go into operation, all in a manner as has been previously described herein.

If the vehicle enters a restricted-speed zone while the mechanism has been reset as previously described to preclude the sounding of an alarm except when the vehicle speed exceeds 60 M. P. H. and the engine speed exceeds 3000 R. P. M., and the operator of the vehicle fails to slacken the speed to conform with the restricted zone requirements, the signal or alarm may be caused to sound despite the said resetting, all in a manner as will be presently described.

If the highway in the speed-restricted zone just above referred to is provided with a primary-induction coil suitably located and energized, the said induction-coil will induce an alternating current in the induction-coil 255, which alternating current will be converted by the rectifier 254 into direct current. This direct current will energize the coil 250, thereby causing both of the armatures 96 and 244 to be attracted thereto. The described movement of the armature 244 will bring it into engagement with the contact 245 to thus energize the coil 249 and thereby serve to continue the magnetization of the core 248 after the vehicle and its induction-coil 255 have passed over the primary-induction coil and the highway, as previously described.

In addition to continuing the magnetization of the core 248 as just described, the engagement of the armature 244 with the contact 245 will also eenrgize the signal-lamp 247, so that the latter will indicate to the operator of the vehicle that he has entered a restricted zone. The described movement of the armature 96 will also have served to simultaneously disengage it from the contact 97, thereby removing the short-circuit from the resistor 91. The resistor 91 will now become fully effective and will again cause the electric motor 51 to operate at the lower of its two substantially-constant speeds, namely, 2250 R. P. M. Under these conditions, the bevel gear 295 will also be caused to operate at the lower of its two speeds, namely, 112.5 R. P. M.

Assuming that the speed of the vehicle remains at the aforesaid 55 M. P. H. (with an engine speed of 2750 R. P. M.), the gong 73 and the chime 115 will be again intermittently energized at the rate of fifty cycles per minute, thus indicating to the operator of the vehicle that both the engine speed and the vehicle speed are in excess of the maximum unrestricted vehicle speed of 45 M. P. H. and engine speed of 2250 R. P. M. The manner in which the gong 73 and chime 115 have been brought into action as just described, corresponds to the mode previously described herein under corresponding conditions where the vehicle speed and engine speed exceeded the maximum unrestricted speeds thereby causing the signals to be sounded.

It may now be assumed that the vehicle has come to the end of the speed-restricted zone and has passed into another section thereof where conditions permit the movement of the vehicle at speeds in excess of 45 M. P. H. Under these conditions, the operator of the vehicle will desire to remove the speed-restrictions previously imposed, by having the electric motor 51 operating at the lower of its two rates of speed, namely 2250 R. P. M. To effect the removal of these limitations, the operator momentarily operates the push-button 224 of the make-before-break switch 219, to thereby move the contact 225 thereof into engagement with the contact 226 and coincidentally move the contact 227 out of engagement with the contact 228. The operation of the said push-button 224 as just described will accomplish the results previously described herein, which includes the restoration of the electric motor 51 to a condition wherein it operates at its higher rate of speed, namely, 3000 R. P. M., to thus again permit higher rates of operation of the engine without the giving of the signals.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A speed-alarm system for automobiles and other vehicles, including in combination: a first rotary control-member; a second rotary control-member; first drive-means operatively connected to the said first rotary control-member and constructed and arranged to drive the same at at least one substantially-constant speed; second drive-means operatively interconnecting the said second rotary control-member with a variable-speed portion of a vehicle and causing the said variable-speed portion to drive the second rotary control-member; speed-changing means constructed and arranged to selectively alter the speed at which one of the said drive-means drives the control-member to which it is connected; signal-control means; translating-means jointly controlled by both of the said first control-member and second control-member and in turn translating the movements thereof into operation of the said signal-control means; and signal-means actuated by the said signal-control means.

2. A speed-alarm system for automobiles and other vehicles, including in combination: a first rotary control-member; a second rotary control-member; mutually-coacting cam-means respectively driven by the said control-members and constructed and arranged to cause the said first control-member to drive the said second control-member when the speed at which the first control-member is driven by the hereinafter-mentioned first drive-means exceeds the speed at which the second control-member is driven by the hereinafter-mentioned second drive-means; one of the said control-members being constructed and arranged to be axially movable toward and away from the other of said control-members under the control of the said cam-means and at rates varying in accordance with the differences in speed between the two said control-members; first drive-means operatively connected to the said first rotary control-member and constructed and arranged to drive the same at at least one substantially-constant speed; second drive-means operatively interconnecting the said second rotary control-member with a variable-speed portion of a vehicle and causing the said portion to drive the second rotary control-member, the said second drive-means including a one-way clutch interposed therein, the said one-way clutch being constructed and arranged to idle to permit the said second control-member to be driven by the said first control-member when the speed of the said variable-speed portion is below a predetermined speed, the said one-way clutch being also constructed and arranged to cause the said second control-member to be driven by the said second drive-means at rates in accordance with the speed of the said variable-speed portion when the same exceeds the said predetermined speed to thereby cause the said mutually-coacting cam-means to effect axial movement of the said axially-movable control-member; speed-changing means constructed and arranged to selectively alter the speed at which one of the said drive-means drives the control-member to which it is connected; signal-control means controlled by the axial movement of the said axially-movable control-member; and signal-means operatively connected with the said signal-control means and controlled thereby in accordance with the operation of the two said control-members.

3. A speed-alarm system for automobiles and other vehicles, including in combination: a first rotary control-member; a second rotary control-member; mutually-coacting cam-means respectively driven by the said control-members and constructed and arranged to cause the said first control-member to drive the said second control-member when the speed at which the first control-member is driven by the hereinafter-mentioned first drive-means exceeds the speed at which the second control-member is driven by the hereinafter-mentioned second drive-means; one of the said control-members being constructed and arranged to be axially movable toward and away from the other of said control-members under the control of the said cam-means and at rates varying in accordance with the differences in speed between the two said control-members; first drive-means operatively connected to the said first rotary control-member and constructed and arranged to drive the same at at least one substantially-constant speed; second drive-means operatively interconnecting the said second rotary control-member with the running-gear of a vehicle and causing the said running-gear to drive the second rotary control-member, the said second drive-means including a one-way clutch interposed therein, the said one-way clutch being constructed and arranged to idle to permit the said second control-member to be driven by the said first control-member when the speed of the said running-gear is below a predetermined speed, the said one-way clutch also being constructed and arranged to cause the said second control-member to be driven by the said second drive-means at rates in accordance with the speed of the said running-gear when the same exceeds the said predetermined speed to thereby cause the said mutually-coacting cam-means to effect axial movement of the said axially-movable control-member; speed-changing means constructed and arranged to selectively alter the speed at which one of the said drive-means drives the control-member to which it is connected; signal-control means controlled by the axial movement of the said axially-movable control-member; and signal-means operatively connected with the said signal-control means and controlled thereby in accordance with the operation of the two said control-members.

4. A speed-alarm system for automobiles and other vehicles, including in combination: a first rotary control-member; a second rotary control-member; mutually-coacting cam-means respectively driven by the said control-members and constructed and arranged to cause the said first control-member to drive the said second control-member when the speed at which the first control-member is driven by the hereinafter-mentioned first drive-means exceeds the speed at which the second control-member is driven by the hereinafter-mentioned second drive-means; one of the said control-members being constructed and arranged to be axially movable toward and away from the other of said control-members under the control of the said cam-means and at rates varying in accordance with the differences in speed between the two said control-members; first drive-means operatively connected to the said first rotary control-member and constructed and arranged to drive the same at at least one substantially constant speed; second drive-means operatively interconnecting the said second rotary control-member with the engine of a vehicle and causing the said engine to drive the second rotary control-member, the said second drive-means including a one-way clutch interposed therein, the said one-way clutch being constructed and arranged to idle to permit the said second control-member to be driven by the said first control-member when the speed of the said engine is below a predetermined speed, the said one-way clutch also being constructed and arranged to cause the said second control-member to be driven by the said second drive-means at rates in accordance with the speed of the said engine when the same exceeds the said predetermined speed to thereby cause the said mutually-coacting cam-means to effect axial movement of the said axially-movable control-member; speed-changing means constructed and arranged to selectively alter the speed at which one of the said drive-means drives the control-member to which it is connected; signal-control means controlled by the axial movement of the said axially-movable control-member; and signal-means operatively connected with the said signal-control means and controlled thereby in accordance with the operation of the two said control-members.

5. A speed-alarm system for automobiles and other vehicles, including in combination: a differential-mechanism having a first drive gear-unit, a second drive gear-unit, and a driven gear-unit, the three said gear-units being constructed and arranged to cause the two said drive gear-units to respectively urge the said driven gear-unit in opposite directions and to cause the said driven gear-unit to move in one direction when the effective driving speed of the said first drive gear-unit exceeds the effective driving speed of the said second drive gear-unit and to cause the said driven gear-unit to move in the opposite direction when the effective driving speed of the said second drive gear-unit exceeds the effective driving speed of the said first drive gear-unit; first drive-means operatively connected to the said first drive gear-unit and constructed and arranged to drive the same at at least one substantially-constant speed; second drive-means operatively interconnecting the said second drive gear-unit with a variable-speed portion of a vehicle and causing the said variable-speed portion to drive the said second drive gear-unit; speed-changing means constructed and arranged to selectively alter the speed at which one of the said drive-means drives the drive gear-unit to which it is connected; control-cam means operatively connected with the said driven gear-unit to be moved in opposite directions thereby under the control of the two said drive gear-units; signal-control means operatively associated with and controlled by the said control-cam means, the said control-cam means being constructed and arranged to maintain the said signal-control means in its nonoperative position when the effective driving speed of the said first drive gear-unit exceeds the effective driving speed of the said second drive gear-unit thereby causing the said control-cam means to be moved in one direction, and to control operation of the said signal-control means when the effective driving speed of the said second drive gear-unit exceeds the effective driving speed of the said first drive gear-unit thereby causing the said control-cam means to be moved in the opposite direction; and signal-means operatively connected with and controlled by the said signal-control means.

6. The combination defined in claim 5 wherein said control-cam means comprises a first cam and a second cam, said first cam being operatively connected with said driven gear-unit and relatively movable within predetermined limits with respect to said second cam upon a change in the direction of movement of said driven gear-unit, said second cam being operatively associated with said first cam and movable therewith, said cams having lobes constructed and arranged to jointly provide a continuous substantially concentric surface for maintaining said signal-control means in its nonoperative position when said cams are moved together in the said one direction, at least one of said cams being rendered operative by reason of the limited relative movement of said first cam with respect to said second cam thereby changing the relative position of a lobe on said first cam with respect to a lobe on said second cam to provide a nonconcentric surface for effecting repeating cycles of operation of said signal-control means when said cams are moved together in the said opposite direction; and wherein said signal-means is controlled by said signal-control means in accordance with the movement of said cams and the relative positions of said lobes.

7. A speed-alarm system for automobiles and other vehicles, including in combination: a differential-mechanism having a first drive gear-unit, a second drive gear-unit, and a driven gear-unit, the said three gear-units being constructed and arranged to cause the two said drive gear-units to respectively urge the said driven gear-unit in opposite directions and to cause the said driven gear-unit to move in one direction when the effective driving speed of the said first drive gear-unit exceeds the effective driving speed of the said second drive gear-unit and to cause the said driven gear-unit to move in the opposite direction when the effective driving speed of the said second drive gear-unit exceeds the effective driving speed of the said first drive gear-unit; first drive-means operatively connected to the said first drive gear-unit and constructed and arranged to drive the same at at least one substantially-constant speed; second drive-means operatively interconnecting the said second drive gear-unit with the running-gear of a vehicle and causing the said running-gear to drive the said second drive gear-unit; speed-changing means constructed and arranged to selectively alter the speed at which one of the said drive-means drives the drive gear-unit to which it is connected; control-cam means operatively connected with the said driven gear-unit to be moved in opposite directions thereby under control of the two said drive gear-units; signal-control means operatively associated with and controlled by the said control-cam means, the said control-cam means being constructed and arranged to maintain the said signal-control means in its nonoperative position when the effective driving speed of the said first drive gear-unit exceeds the effective driving speed of the said second drive gear-unit thereby causing the said control-cam means to be moved in one direction, and to control operation of the said signal-control means when the effective driving speed of the said second drive gear-unit exceeds the effective driving speed of the said first drive gear-unit thereby causing the said control-cam means to be moved in the opposite direction; and signal-means operatively connected with and controlled by the said signal-control means.

8. A speed-alarm system for automobiles and other vehicles, including in combination: a differential-mechanism having a first drive gear-unit, a second drive gear-unit, and a driven gear-unit, the three said gear-units being constructed and arranged to cause the two said drive gear-units to respectively urge the said driven gear-unit in opposite directions and to cause the said driven gear-unit to move in one direction when the effective driving speed of the said first drive gear-unit exceeds the effective driving speed of the said second drive gear-unit and to cause the said driven gear-unit to move in the opposite direction when the effective driving speed of the said second drive gear-unit exceeds the effective driving speed of the said first drive gear-unit; first drive-means operatively connected to the said first drive gear-unit and constructed and arranged to drive the same at at least one substantially-constant speed; second drive-means operatively interconnecting the said second drive gear-unit with the engine of a vehicle and causing the said engine to drive the said second drive gear-unit; speed-changing means constructed and arranged to selectively alter the speed at which one of the said drive-means drives the drive gear-unit to which it is connected; control-cam means operatively connected with the said driven gear-unit to be moved in opposite directions thereby under control of the two said drive gear-units; signal-control means operatively associated with and controlled by the said control-cam means, the said control-cam means being constructed and arranged to maintain the said signal-control means in its nonoperative position when the effective driving speed of the said first drive gear-unit exceeds the effective driving speed of the said second drive gear-unit thereby causing the said control-cam means to be moved in one direction, and to control operation of the said signal-control means when the effective driving speed of the said second drive gear-unit exceeds the effective driving speed of the said first drive gear-unit thereby causing the said control-cam means to be moved in the opposite direction; and signal-means operatively connected with and controlled by the said signal-control means.

9. A speed-alarm system for automobiles and other vehicles, including in combination: a first rotary control-member; a second rotary control-member; first drive-means operatively connected to the said first rotary control-member and constructed and arranged to drive the same at at least one substantially-constant speed; second drive-means constructed and arranged to drive the said second rotary control-member and including a differential-mechanism, the said differential-mechanism having a first drive gear-unit operatively connected to the running-gear of a vehicle and driven thereby, a second drive gear-unit operatively connected to the engine of the vehicle and driven thereby, and a driven gear-unit, the three said gear-units being constructed and arranged to cause the two said drive gear-units to respectively urge the said driven gear-unit in opposite directions; speed-changing means constructed and arranged to selectively alter the speed at which one of the said drive-means drives the control-member to which it is connected; signal-control means; translating-means jointly controlled by both of the said first control-member and second control-member and in turn translating the movements thereof into operation of the said signal-control means; and signal-means actuated by the said signal-control means.

10. A speed-alarm system for automobiles and other vehicles, including in combination: a first rotary control-member; a second rotary control-member; mutually-coacting cam-means respectively driven by the said control-members and constructed and arranged to cause the said first control-member to drive the said second control-member when the speed at which the first control-member is driven by the hereinafter-mentioned first drive-means exceeds the speed at which the second control-member is driven by the hereinafter-mentioned second drive-means; one of the said control-members being constructed and arranged to be axially movable toward and away from the other of said control-members under control of the said cam-means and at rates varying in accordance with the differences in speed between the two said control-members; first drive-means operatively connected to the said first rotary control-member and constructed and arranged to drive the same at at least one substantially-constant speed; second drive-means constructed and arranged to drive the said second rotary control-member and including a differential-mechanism, the said differential-mechanism having a first drive gear-unit operatively connected to the running-gear of a vehicle and driven thereby, a second drive gear-unit operatively connected to the engine of the vehicle and driven thereby, and a driven gear-unit, the three said gear-units being constructed and arranged to cause the two said drive gear-units to respectively urge the said driven gear-unit in opposite directions, the said second drive-means also including a one-way clutch interposed between the said driven gear-unit and the said second control-member; the said one-way clutch being constructed and arranged to idle to permit the said second control-member to be driven by the said first control-member when the speed of the engine is below predetermined speeds with respect to predetermined speeds of the running-gear of the vehicle, the said one-way clutch also being constructed and arranged to cause the said second control-member to be driven by the said second drive-means at rates in accordance with predetermined differences between the speed of the engine and the speed of the running-gear of the vehicle to thereby cause the said mutually-coacting cam-means to effect axial movement of the said axially-movable control-member; speed-changing means constructed and arranged to selectively alter the speed at which one of the said drive-means drives the control-member to which it is connected; signal-control means controlled by the axial movement of the said axially-movable control-member; and signal-means operatively connected with the said signal-control means and controlled thereby in accordance with the operation of the two said control-members.

11. A speed-alarm system for automobiles and other vehicles, including in combination: a first differential-mechanism having a first drive gear-unit, a second drive gear-unit, and a driven gear-unit, the three said gear-units being constructed and arranged to cause the two said drive gear-units to respectively urge the said driven gear-unit in opposite directions and to cause the said driven gear-unit to move in one direction when the effective driving speed of the said first drive gear-unit exceeds the effective driving speed of the said second drive gear-unit and to cause the said driven gear-unit to move in the opposite direction when the effective driving speed of the said second drive gear-unit exceeds the effective driving speed of the said first drive gear-unit; first drive-means operatively connected to the said first drive gear-unit and constructed and arranged to drive the same at at least one substantially-constant speed; second drive-means constructed and arranged to drive the said second drive gear-unit and including a second differential-mechanism; said second differential-mechanism having a first drive gear-unit operatively connected to the running-gear of a vehicle and driven thereby, a second drive gear-unit operatively connected to the engine of the vehicle and driven thereby, and a driven gear-unit, the three said gear-units being constructed and arranged to cause the two said drive gear-units to respectively urge the said driven gear-unit in opposite directions, the said driven gear-unit being operatively connected to the second drive gear-unit of the said first differential-mechanism; speed-changing means constructed and arranged to selectively alter the speed at which one of the said drive-means drives the drive gear-unit to which it is connected; control-cam means operatively connected with the driven gear-unit of the said first differential-mechanism to be moved in opposite directions thereby under control of the two said drive gear-units thereof; signal-control means operatively associated with and controlled by the said control-cam means, the said control-cam means being constructed and arranged to maintain the said signal-control means in its nonoperative position when the said control-cam means is moved in one direction, and to control operation of the said signal-control means when the said control-cam means is moved in the opposite direction; and signal-means operatively connected with and controlled by the said signal-control means.

12. A speed-alarm system for automobiles and other vehicles, including in combination: a first rotary control-member; a second rotary control-member; mutually-coacting cam-means respectively driven by the said control-members and constructed and arranged to cause the said first control-member to drive the said second control-member when the speed at which the first control-member is driven by the hereinafter-mentioned first drive-means exceeds the speed at which the second control-member is driven by the hereinafter-mentioned second drive-means; one of the said control-members being constructed and arranged to be axially movable toward and away from the other of said control-members under control of the said cam-means and at rates varying in accordance with the differences in speed between the two said control-members; first drive-means operatively connected to the said first rotary control-member and constructed and arranged to drive the same at at least one substantially-constant speed; second drive-means operatively interconnecting the said second rotary control-member with the running-gear of a vehicle and causing the said running-gear to drive the second rotary control-member, the said second drive-means including a first one-way clutch interposed therein, the said first one-way clutch being constructed and arranged to idle to permit the said second control-member to be driven by the said first control-member when the speed of the running-gear of the vehicle is below a predetermined speed, the said one-way clutch also being constructed and arranged to cause the said second control-member to be driven by the said second drive-means at rates in accordance with the speed of the running-gear of said vehicle when the same exceeds the said predetermined speed to thereby cause the said mutually-coacting cam-means to effect axial movement of the said axially-movable control-member; third drive-means constructed and arranged to also drive the said second control-member and including a differential-mechanism, the said differential-mechanism having a first drive gear-unit operatively connected to the running-gear of the vehicle and driven thereby, a second drive gear-unit operatively connected to the engine of the vehicle and driven thereby, and a driven gear-unit, the three said gear-units being constructed and arranged to cause the two said drive gear-units to respectively urge the said driven gear-unit in opposite directions, the said third drive-means also including a second one-way clutch interposed between the said driven gear-unit and the said second control-member, the said second one-way clutch being constructed and arranged to idle to permit the said second control-member to be driven by the said first control-member when the speed of the engine is below predetermined speeds with respect to pre-determined speeds of the running-gear of the vehicle, the said second one-way clutch also being constructed and arranged to cause the said second control-member to be driven by the said third drive-means at rates in accordance with predetermined differences between the speed of the engine and the speed of the running-gear of the vehicle to thereby cause the said mutually-coacting cam-means to effect axial movement of the said axially-movable control-member; speed-changing means constructed and arranged to selectively alter the speed at which one of the said drive-means drives the control-member to which it is connected; signal-control means controlled by the axial movement of the said axially-movable control-member; and signal-means operatively connected with the said signal-control means and controlled thereby in accordance with the operation of the two said control-members.

13. A speed-alarm system for automobiles and other vehicles, including in combination: a first rotary control-member; a second rotary control-member; first drive-means operatively connected to the said first rotary control-member and constructed and arranged to drive the same at at least one substantially-constant speed; second drive-means operatively interconnecting the said second rotary control-member with a variable-speed portion of a vehicle and causing the said variable-speed portion to drive the second rotary control-member; speed-changing means constructed and arranged to selectively alter the speed at which one of the said drive-means drives the control-member to which it is connected; an energizing circuit including a source of electrical energy and switch-means; translating-means jointly controlled by the movements of both the said first control-member and second control-member and in turn translating the movements thereof into operation of the said switch-means; and signal-means electrically connected with the said switch-means and the said source of electrical energy, the said signal-means being controlled by the operation of the said switch-means in accordance with the operation of the two said control-members.

14. A speed-alarm system for automobiles and other vehicles, including in combination: a first rotary control-member; a second rotary control-member; mutually-coacting cam-means respectively driven by the said control-members and constructed and arranged to cause the said first control-member to drive the said second control-member when the speed at which the first control-member is driven by the hereinafter-mentioned first drive-means exceeds the speed at which the second control-member is driven by the hereinafter-mentioned second drive-means; one of the said control-members being constructed and arranged to be axially movable toward and away from the other of said control-members under the control of the said cam-means and at rates varying in accordance with the differences in speed between the two said control-members; first drive-means operatively connected to the said first rotary control-member and constructed and arranged to drive the same at at least one substantially-constant speed; second drive-means operatively interconnecting the said second rotary control-member with a variable-speed portion of a vehicle and causing the said portion to drive the second rotary control-member, the said second drive-means including a one-way clutch interposed therein, the said one-way clutch being constructed and arranged to idle to permit the said second control-member to be driven by the said first control-member when the speed of the said variable-speed portion is below a predetermined speed, the said one-way clutch also being constructed and arranged to cause the said second control-member to be driven by the said second drive-means at rates in accordance with the speed of the said variable-speed portion when the same exceeds the said pre-determined speed to thereby cause the said mutually-coacting cam-means to effect axial movement of the said axially-movable control-member; speed-changing means constructed and arranged to selectively alter the speed at which one of the said drive-means drives the control-member to which it is connected; an energizing circuit including a source of electrical energy and switch-means, said switch-means being controlled by the axial movement of the said axially-movable control-member; and signal-means electrically connected with the said switch-means and the said source of electrical energy, the said signal-means being controlled by the operation of the said switch-means in accordance with the operation of the two said control-members.

15. A speed-alarm system for automobiles and other vehicles, including in combination: a differential-mechanism having a first drive gear-unit, a second drive gear-unit, and a driven gear-unit, the three said gear-units being constructed and arranged to cause the two said drive gear-units to respectively urge the said driven gear-unit in opposite directions and to cause the said driven gear-unit to move in one direction when the effective driving speed of the said first drive gear-unit exceeds the effective driving speed of the said second drive gear-unit and to cause the said driven gear-unit to move in the opposite direction when the effective driving speed of the said second drive gear-unit exceeds the effective driving speed of the said first drive gear-unit; first drive-means operatively connected to the said first drive gear-unit and constructed and arranged to drive the same at at least one substantially-constant speed; second drive-means operatively interconnecting the said second drive gear-unit with a variable-speed portion of a vehicle and causing the said variable-speed portion to drive the second drive gear-unit; speed-changing means constructed and arranged to selectively alter the speed at which one of the said drive-means drives the drive gear-unit to which it is connected; control-cam means operatively connected with the said driven gear-unit to be moved in opposite directions thereby under control of the two said drive gear-units; an energizing circuit including a source of electrical energy and switch means, said switch-means being operatively associated with and controlled by the said control-cam means, the said control-cam means being constructed and arranged to maintain the said switch-means in its nonoperative position when the effective driving speed of the said first drive gear-unit exceeds the effective driving speed of the said second drive gear-unit thereby causing the said control-cam means to be moved in one direction, and to control operation of the said switch-means when the effective driving speed of the said second drive gear-unit exceeds the effective driving speed of the said first drive gear-unit thereby causing the said control-cam means to be moved in the opposite direction; and signal-means electrically connected with the said switch-means and the said source of electrical energy.

16. The combination defined in claim 15 wherein said control-cam means comprises a first cam and a second cam, said first cam being operatively connected with said driven gear-unit and relatively movable within predetermined limits with respect to said second cam upon a change in the direction of movement of said driven gear-unit, said second cam being operatively associated with said first cam and movable therewith, said cams having lobes constructed and arranged to jointly provide a continuous substantially concentric surface for maintaining said switch-means in its nonoperative position when said cams are moved together in the said one direction, at least one of said cams being rendered operative by reason of the limited relative movement of said first cam with respect to said second cam thereby changing the relative position of a lobe on said first cam with respect to a lobe on said second cam to provide a nonconcentric surface for effecting repeating cycles of operation of said switch-means when said cams are moved together in the said opposite direction; and wherein said signal-means is controlled by said switch-means in accordance with the movement of said cams and the relative positions of said lobes.

17. A speed-alarm system for an automobile or other vehicle having a speed-controlling member and including in combination: a first rotary control-member; a second rotary control-member; first drive-means operatively connected to the said first rotary control-member and constructed and arranged to drive the same at at least one substantially-constant speed; second drive-means operatively interconnecting the said second rotary control-member with a variable-speed portion of a vehicle and causing the said variable-speed portion to drive the second rotary control-member; speed-changing means constructed and arranged to selectively alter the speed at which one of the said drive-means drives the control-member to which it is connected; first switch-means; translating-means jointly controlled by both of the said first control-member and second control-member and in turn translating the movements thereof into operation of the said first switch-means; a source of electrical energy; a switch-operating electromagnet; a second switch-means controlled by said switch-operating electromagnet; a third switch-means arranged to be controlled by the movement of said speed-controlling member of the vehicle; an energizing circuit for the said switch-operating electromagnet and including the said source of electrical energy, the said first switch-means and the said third switch-means, the said energizing circuit being arranged to be rendered effective to initially energize the said switch-operating electromagnet by the actuation of the said first switch-means under control of the said translating-means and when the said speed-controlling member is in its operational position; a locking-circuit for the said switch-operating electromagnet and including the said source of electrical energy, the said second switch-means and the said third switch-means, the said locking-circuit being arranged to be rendered effective by the operation of the said second switch-means to thereby continue the energization of the said switch-operating electromagnet subsequent to the initial energization thereof; and signal-means arranged to be energized by the energization of the said switch-operating electromagnet.

18. A speed-alarm system for an automobile or other vehicle having a speed-controlling member and including in combination: a first rotary control-member; a second rotary control-member; mutually-coacting cam-means respectively driven by the said control-members and constructed and arranged to cause the said first control-member to drive the said second control-member when the speed at which the first control-member is driven by the hereinafter-mentioned first drive-means exceeds the speed at which the second control-member is driven by the hereinafter-mentioned second drive-means; one of the said control-members being constructed and arranged to be axially movable toward and away from the other of said control-members under the control of the said cam-means and at rates varying in accordance with the differences in speed between the two said control-members; first drive-means operatively connected to the said first rotary control-member and constructed and arranged to drive the same at at least one substantially-constant speed; second drive-means operatively interconnecting the said second rotary control-member with a variable-speed portion of the vehicle and causing the said portion to drive the second rotary control-member, the said second drive-means including a one-way clutch interposed therein, the said one-way clutch being constructed and arranged to idle to permit the said second control-member to be driven by the said first control-member when the speed of the said variable-speed portion is below a predetermined speed, the said one-way clutch also being constructed and arranged to cause the said second control-member to be driven by the said second drive-means at rates in accordance with the speed of the said variable-speed portion when the same exceeds the said predetermined speed to thereby cause the said mutually-coacting cam-means to effect axial movement of the said axially-movable control-member; speed-changing means constructed and arranged to selectively alter the speed at which one of the said drive-means drives the control-member to which it is connected; first switch-means controlled by the axial movement of the said axially-movable control-member; a source of electrical energy; a switch-operating electromagnet; second switch-means controlled by the said switch-operating electromagnet; third switch-means controlled by the movement of the said speed-controlling member of the vehicle; an energizing circuit for the said switch-operating electromagnet and including the said source of electrical energy, the said first switch-means and the said third switch-means, the said energizing circuit being arranged to be rendered effective to initially energize the said switch-operating electromagnet by the actuation of the said first switch-means under control of the axial movement of the said axially-movable control-member and when the said speed-controlling member is in its operational position; a locking-circuit for the said switch-operating electromagnet and including the said source of electrical energy, the said second switch-means and the said third switch-means, the said locking-circuit being arranged to be rendered effective by the operation of the said second switch-means to thereby continue the energization of the said switch-operating electromagnet subsequent to the initial energization thereof; and signal-means arranged to be energized by the energization of the said switch-operating electromagnet.

19. A speed-alarm system for an automobile or other vehicle having a speed-controlling member and including in combination: a differential-mechanism having a first drive gear-unit, a second drive gear-unit, and a driven gear-unit, the three said gear-units being constructed and arranged to cause the two said drive gear-units to respectively urge the said driven gear-unit in opposite directions to cause the said driven gear-unit to move in one direction when the effective driving speed of the said first drive gear-unit exceeds the effective driving speed of the said second drive gear-unit and to cause the said driven gear-unit to move in the opposite direction when the effective driving speed of the said second drive gear-unit exceeds the effective driving speed of the said first drive gear-unit; first drive-means operatively connected to the said first drive gear-unit and constructed and arranged to drive the same at at least one substantially-constant speed; second drive-means operatively interconnecting the said second drive gear-unit with a variable-speed portion of a vehicle and causing the said variable-speed portion to drive the said second drive gear-unit; speed-changing means constructed and arranged to selectively alter the speed at which one of the said drive-means drives the drive gear-unit to which it is connected; control-cam means operatively connected with the said driven gear-unit to be moved in opposite directions thereby under control of the two said drive gear-units; first switch-means operatively associated with the said control-cam means, the said control-cam means being constructed and arranged to maintain the said first switch-means in its non-operative position when the said driven gear-unit is moved in one direction, and to actuate the said first switch-means when the said driven gear-unit is moved in the opposite direction; a source of electrical energy; a switch-operating electromagnet; a second switch-means controlled by the said switch-operating electromagnet; third switch-means controlled by the movement of the said speed-controlling member of the vehicle; an energizing circuit for the said switch-operating electromagnet and including the said source of electrical energy, the said first switch-means and the said third switch-means, the said energizing circuit being arranged to be rendered effective to initially energize the said switch-operating electromagnet by the actuation of the said first switch-means under control of the said control-cam means and when the said speed-controlling member is in its operational position; a locking-circuit for the said switch-operating electromagnet and including the said source of electrical energy, the said second switch-means and the said third switch-means, the said locking-circuit being arranged to be rendered effective by the operation of the said second switch-means to thereby continue the energization of the said switch-operating electromagnet subsequent to the initial energization thereof; and signal-means arranged to be energized by the energization of the said switch-operating electromagnet.

20. A speed-alarm system for an automobile or other vehicle having a speed-controlling member and including in combination: a first rotary control-member; a second rotary control-member; first drive-means operatively connected to the said first rotary control-member and constructed and arranged to drive the same at at least one substantially-constant speed; second drive-means constructed and arranged to drive the said second rotary control-member and including a differential-mechanism, the said differential-mechanism having a first drive gear-unit operatively connected to the running-gear of the vehicle and driven thereby, a second drive gear-unit operatively connected to the engine of the vehicle and driven thereby, and a driven gear-unit, the three said gear-units being constructed and arranged to cause the two said drive gear-units to respectively urge the said driven gear-unit in opposite directions; speed-changing means constructed and arranged to selectively alter the speed at which one of the said drive-means drives the control-member to which it is connected; first switch-means; translating-means jointly controlled by both of the said first control-member and second control-member and in turn translating the movements thereof into operation of the said first switch-means; a source of electrical energy; a switch-operating electromagnet; second switch-means controlled by the said switch-operating electromagnet; third switch-means controlled by the movement of the said speed-controlling member of the vehicle; an energizing circuit for the said switch-operating electromagnet and including the said source of electrical energy, the said first switch-means and the said third switch-means, the said energizing circuit being arranged to be rendered effective to initially energize the said switch-operating electromagnet by the actuation of the said first switch-means under control of the said translating-means and when the said speed-controlling member is in its operational position; a locking-circuit for the said switch-operating electromagnet and including the said source of electrical energy, the said second switch-means and the said third switch-means, the said locking-circuit being arranged to be rendered effective by the operation of the said second switch-means to thereby continue the energization of the said switch-operating electromagnet subsequent to the initial energization thereof; and signal-means arranged to be energized by the energization of the said switch-operating electromagnet.

21. A speed-alarm system for an automobile or other vehicle having a speed-controlling member and including in combination: a first rotary control-member; a second rotary control-member; mutually-coacting cam-means respectively driven by the said control-members and constructed and arranged to cause the said first control-member to drive the said second control-member when the speed at which the first control-member is driven by the hereinafter-mentioned first drive-means exceeds the speed at which the second control-member is driven by the hereinafter-mentioned second drive-means, one of the said control-members being constructed and arranged to be axially movable toward and away from the other of said control-members under control of the said cam-means and at rates varying in accordance with the differences in speed between the two said control-members; first drive-means operatively connected to the said first rotary control-member and constructed and arranged to drive the same at at least one substantially-constant speed; second drive-means constructed and arranged to drive the said second rotary control-member and including a differential-mechanism, the said differential-mechanism having a first drive gear-unit operatively connected to the running-gear of the vehicle and driven thereby, a second drive gear-unit operatively connected to the engine of the vehicle and driven thereby, and a driven gear-unit, the three said gear-units being constructed and arranged to cause the two said drive gear-units to respectively urge the said driven gear-unit in opposite directions, the said second drive-means also including a one-way clutch interposed between the said driven gear-unit and the said second control-member; the said one-way clutch being constructed and arranged to idle to permit the said second control-member to be driven by the said first control-member when the speed of the engine is below predetermined speeds with respect to predetermined speeds of the running-gear of the vehicle, the said one-way clutch also being constructed and arranged to cause the said second control-member to be driven by the said second drive-means at rates in accordance with predetermined differences between the speed of the engine and the speed of the running-gear of the vehicle to thereby cause the said mutually-coacting cam-means to effect axial movement of the said axially-movable control-member; speed-changing means constructed and arranged to selectively alter the speed at which one of the said drive-means drives the control-member to which it is connected; first switch-means controlled by the axial movement of the said axially-movable control-member; a source of electrical energy; a switch-operating electromagnet; second switch-means controlled by the said switch-operating electromagnet; third switch-means controlled by the movement of the said speed-controlling member of the vehicle; an energizing circuit for the said switch-operating electromagnet and including the said source of electrical energy, the said first switch-means and the said third switch-means, the said energizing circuit being arranged to be rendered effective to initially energize the said switch-operating electromagnet by the actuation of the said first switch-means under control of the axial movement of the said axially-movable control-member and when the said speed-controlling member is in its operational position; a locking-circuit for the said switch-operating electromagnet and including the said source of electrical energy, the said second switch-means and the said third switch-means, the said locking-circuit being arranged to be rendered effective by the operation of the said second switch-means to thereby continue the energization of the said switch-operating electromagnet subsequent to the initial energization thereof; and signal-means arranged to be energized by the energization of the said switch-operating electromagnet.

22. A speed-alarm system for an automobile or other vehicle having a speed-controlling member and including in combination: a first differential-mechanism having a first drive gear-unit, a second drive gear-unit, and a driven gear-unit, the three said gear-units being constructed and arranged to cause the two said drive gear-units to respectively urge the said driven gear-unit in opposite directions and to cause the said driven gear-unit to move in one direction when the effective driving speed of the said first drive gear-unit exceeds the effective driving speed of the said second drive gear-unit and to cause the said driven gear-unit to move in the opposite direction when the effective driving speed of the said second drive gear-unit exceeds the effective driving speed of the said first drive gear-unit; first drive-means operatively connected to the said first drive gear-unit and constructed and arranged to drive the same at at least one substantially-constant speed; second drive-means constructed and arranged to drive the said second drive gear-unit and including a second differential-mechanism; the said second differential-mechanism having a first drive gear-unit operatively connected to the running-gear of a vehicle and driven thereby, a second drive gear-unit operatively connected to the engine of the vehicle and driven thereby, and a driven gear-unit, the three said gear-units being constructed and arranged to cause the two said drive gear-units to respectively urge the said driven gear-unit in opposite directions, the said driven gear-unit being operatively connected with the second drive gear-unit of the said first differential-mechanism; speed-changing means constructed and arranged to selectively alter the speed at which one of the said drive-means drives the drive gear-unit to which it is connected; control-cam means operatively connected with the driven gear-unit of the said first differential-mechanism to be moved in opposite directions thereby under the control of the two said drive gear-units thereof; first switch-means operatively associated with the said control-cam means, the said control-cam means being constructed and arranged to maintain the said first switch-means in its nonoperative position when the driven gear-unit of the said first differential-mechanism is moved in one direction, and to actuate the said first switch-means when the said driven gear-unit is moved in the opposite direction; a source of electrical energy; a switch-operating electromagnet; second switch-means controlled by the said switch-operating electromagnet; third switch-means controlled by the movement of the said speed-controlling member of the vehicle; an energing circuit for the said switch-operating electromagnet and including the said source of electrical energy, the said first switch-means and the said third switch-means, the said energizing circuit being arranged to be rendered effective to initially energize the said switch-operating electromagnet by the actuation of the said first switch-means under control of the said control-cam means and when the said speed-controlling member is in its operational position; a locking-circuit for the said switch-operating electromagnet and including the said source of electrical energy, the said second switch-means and the said third switch-means, the said locking-circuit being arranged to be rendered effective by the operation of the said second switch-means to thereby continue the energization of the said switch-operating electromagnet subsequent to the initial energization thereof; and signal-means arranged to be energized by the energization of the said switch-operating electromagnet.

23. A speed-alarm system for an automobile or other vehicle having a speed controlling member and including in combination: a first rotary control-member; a second rotary control-member; first drive-means operatively connected to the said first rotary control-member and constructed and arranged to drive the same at at least one substantially-constant speed; second drive-means operatively interconnecting the said second rotary control-member with a variable-speed portion of a vehicle and causing the said variable-speed portion to drive the said second control-member; speed-changing means constructed and arranged to selectively alter the speed at which one of the said drive-means drives the control-member to which it is connected; first switch-means; translating-means jointly controlled by both of the said first control-member and second control-member and in turn translating the movements thereof into operation of the said first switch-means; a source of electrical energy; a first switch-operating electromagnet; second switch-means controlled by the said first switch-operating electromagnet; third switch-means controlled by the movement of the said speed-controlling member of the vehicle; a first energizing circuit for the said first switch-operating electromagnet and including the said source of electrical energy, the said first switch-means and the said third switch-means, the said first energizing circuit being arranged to be rendered effective to initially energize the said first switch-operating electromagnet by the actuation of the said first switch-means under control of the said translating-means and when the said speed-controlling member is in its operational position; time-delay apparatus including fourth switch-means; a second energizing circuit for the said time-delay apparatus and including the said source of electrical energy and the said first switch-means, the said second energizing circuit being arranged to be rendered effective to initially energize the said time-delay apparatus by the actuation of the said first switch-means under control of the said translating-means; a locking-circuit including the said source of electrical energy, the said second switch-means and the said third switch-means, the said locking-circuit being arranged to be rendered effective by the operation of the said second switch-means to continue the energization of the said first switch-operating electromagnet and thereby continue the energization of the said time-delay apparatus subsequent to the initial energization thereof; a second switch-operating electromagnet; and signal-means arranged to be energized by the energization of the said second switch-operating electromagnet.

24. A speed-alarm system for an automobile or other vehicle having a speed-controlling member and including in combination: a first rotary control-member; a second rotary control-member; first drive-means operatively connected to the said first rotary control-member and constructed and arranged to drive the same at at least one substantially-constant speed; second drive-means operatively interconnecting the said second rotary control-member with a variable-speed portion of a vehicle and causing the said variable-speed portion to drive the said second control-member; speed-changing means constructed and arranged to selectively alter the speed at which one of the said drive-means drives the control-member to which it is connected; first switch-means; translating-means jointly controlled by both of the said first control-member and second control-member and in turn translating the movements thereof into operation of the said first switch-means; a source of electrical energy; a first switch-operating electromagnet; second switch-means controlled by the said first switch-operating electromagnet; third switch-means controlled by the movement of the said speed-controlling member of the vehicle; a first energizing circuit for the said first switch-operating electromagnet and including the said source of electrical energy, the said first switch-means and the said third switch-means, the said first energizing circuit being arranged to be rendered effective to initially energize the said first switch-operating electromagnet by the actuation of the said first switch-means under control of the said translating-means and when the said speed-controlling member is in its operational position; time-delay apparatus including fourth switch-means; a second energizing circuit for the said time-delay apparatus and including the said source of electrical energy and the said first switch-means, the said second energizing circuit being arranged to be rendered effective to initially energize the said time-delay apparatus by the actuation of the said first switch-means under control of the said translating-means; a locking-circuit including the said source of electrical energy, the said second switch-means and the said third switch-means, the said locking-circuit being arranged to be rendered effective by the operation of the said second switch-means to continue the energization of the said first switch-operating electromagnet and thereby continue the energization of the said time-delay apparatus subsequent to the initial energization thereof; a second switch-operating electromagnet; fifth switch-means controlled by the said second switch-operating electromagnet; a third energizing circuit for the said second switch-operating electromagnet and including the said source of electrical energy and the said fourth switch-means, the said third energizing circuit being arranged to be rendered effective after a predetermined time interval by operation of the fourth switch-means of the said time-delay apparatus to thereby initially energize the said second switch-operating electromagnet; manually-operable switch-means; a second locking-circuit for the said second switch-operating electromagnet and including the said source of electrical energy, the said fifth switch-means and the said manually-operable switch-means, the said second locking-circuit being arranged to be rendered effective by the operation of the said fifth switch-means to continue the energization of the said second switch-operating electromagnet subsequent to the initial energization thereof; and signal-means arranged to be energized after a predetermined time-interval by operation of the fourth switch-means of the said time-delay apparatus.

25. A speed-alarm system for an automobile or other vehicle having a speed-controlling member and including in combination: a first rotary control-member; a second rotary control-member; mutually-coacting cam-means respectively driven by the said control-members and constructed and arranged to cause the said first control-member to drive the said second control-member when the speed at which the first control-member is driven by the hereinafter-mentioned first drive-means exceeds the speed at which the second control-member is driven by the hereinafter-mentioned second drive-means, one of the said control-members being constructed and arranged to be axially movable toward and away from the other of said control-members under the control of the said cam-means and at rates varying in accordance with the differences in speed between the two said control-members; first drive-means operatively connected to the said first rotary control-member and constructed and arranged to drive the same at at least one substantially-constant speed; second drive-means operatively interconnecting the said second rotary control-member with a variable-speed portion of the vehicle and causing the said portion to drive the said second control-member, the said second drive-means including a one-way clutch interposed therein, the said one-way clutch being constructed and arranged to idle to permit the said second control-member to be driven by the said first control-member when the speed of the said variable-speed portion is below a predetermined speed, the said one-way clutch also being constructed and arranged to cause the said second control-member to be driven by the said second drive-means at rates in accordance with the speed of the said variable-speed portion when the same exceeds the said predetermined speed to thereby cause the said mutually-coacting cam-means to effect axial movement of the said axially-movable control-member; speed-changing means constructed and arranged to selectively alter the speed at which one of the said drive-means drives the control-member to which it is connected; first switch-means controlled by the axial movement of the said axially-movable control-member; a source of electrical energy; a first switch-operating electromagnet; second switch-means controlled by the said first switch-operating electromagnet; third switch-means controlled by the movement of the said speed-controlling member of the vehicle; a first energizing circuit for the said first switch-operating electromagnet and including the said source of electrical energy, the said first switch-means and the said third switch-means, the said first energizing circuit being arranged to be rendered effective to initially energize the said first switch-operating electromagnet by the actuation of the said first switch-means under control of the axial movement of the said axially-movable control-member and when the said speed-controlling member is in its operational position; time-delay apparatus including fourth switch-means; a second energizing circuit for the said time-delay apparatus and including the said source of electrical energy and the said first switch-means, the said second energizing circuit being arranged to be rendered effective to initially energize the said time-delay apparatus by the actuation of the said first switch-means under control of the axial movement of the said axially-movable control-member; a first locking-circuit including the said source of electrical energy, the said second switch-means and the said third switch-means, the said first locking-circuit being arranged to be rendered effective by the operation of the said second switch-means to continue the energization of the said first switch-operating electromagnet and thereby continue the energization of the said time-delay apparatus subsequent to the initial energization thereof; a second switch-operating electromagnet; fifth switch-means controlled by the said second switch-operating electromagnet; a third energizing circuit for the said second switch-operating electromagnet and including the said source of electrical energy and the said fourth switch-means, the said third energizing circuit being arranged to be rendered effective after a predetermined time interval by operation of the fourth switch-means of the said time-delay apparatus to thereby initially energize the said second switch-operating electromagnet; manually-operable switch-means; a second locking-circuit for the said second switch-operating electromagnet and including the said source of electrical energy, the said fifth switch-means and the said manually-operable switch-means, the said second locking-circuit being arranged to be rendered effective by the operation of the said fifth switch-means to continue the energization of the said second switch-operating electromagnet subsequent to the initial energization thereof; and signal-means arranged to be energized by the energization of the said second switch-operating electromagnet.

26. A speed-alarm system for an automobile or other vehicle having a speed-controlling member and including in combination: a differential-mechanism having a first drive gear-unit, a second drive gear-unit, and a driven gear-unit, the three said gear-units being constructed and arranged to cause the two said drive gear-units to respectively urge the said driven gear-unit in opposite directions and to cause the said driven gear-unit to move in one direction when the effective driving speed of the said first drive gear-unit exceeds the effective driving speed of the said second drive gear-unit to move in the opposite direction when the effective driving speed of the said second drive gear-unit exceeds the effective driving speed of the said first drive gear-unit; first drive-means operatively connected to the said first drive gear-unit and constructed and arranged to drive the same at at least one substantially-constant speed; second drive-means operatively interconnecting the said second drive gear-unit with a variable-speed portion of a vehicle and causing the said variable-speed portion to drive the said second drive gear-unit; speed-changing means constructed and arranged to selectively alter the speed at which one of the said drive-means drives the drive gear-unit to which it is connected; control-cam means operatively connected with the said driven gear-unit to be moved in opposite directions thereby under control of the two said drive gear-units; first switch-means operatively associated with the said control-cam means, the said control-cam means being constructed and arranged to maintain the said first switch-means in its nonoperative position when the said driven gear-unit is moved in one direction, and to actuate the said first switch-means when the said driven gear-unit is moved in the opposite direction; a source of electrical energy; a first switch-operating electromagnet; second switch-means controlled by the said first switch-operating electromagnet; third switch-means controlled by the movement of the said speed-controlling member of the vehicle; a first energizing circuit for the said first switch-operating electromagnet and including the said source of electrical energy, the said first switch-means and the said third switch-means, the said first energizing circuit being arranged to be rendered effective to initially energize the said first switch-operating electromagnet by the actuation of the said first switch-means under control of the said control-cam means and when the said speed-controlling member is in its operational position; time-delay apparatus including fourth switch-means; a second energizing circuit for the said time-delay apparatus and including the said source of electrical energy and the said first switch-means, the said second energizing circuit being arranged to be rendered effective to initially energize the said time-delay apparatus by the actuation of the said first switch-means under control of the said control-cam means; a first locking-circuit including the said source of electrical energy, the said second switch-means and the said third switch-means, the said first locking-circuit being arranged to be rendered effective by the operation of the said second switch-means to continue the energization of the said first switch-operating electromagnet and thereby continue the energization of the said time-delay apparatus subsequent to the initial energization thereof; a second switch-operating electromagnet; fifth switch-means controlled by the said second switch-operating electromagnet; a third energizing circuit for the said second switch-operating electromagnet and including the said source of electrical energy and the said fourth switch-means, the said third energizing circuit being arranged to be rendered effective after a predetermined time interval by operation of the fourth switch-means of the said time-delay apparatus to thereby initially energize the said second switch-operating electromagnet; manually-operable switch-means; a second locking-circuit for the said second switch-operating electromagnet and including the said source of electrical energy, the said fifth switch-means and the said manually-operable switch-means, the second locking-circuit being arranged to be rendered effective by the operation of the said fifth switch-means to continue the energization of the said second switch-operating electromagnet subsequent to the initial energization thereof; and signal-means arranged to be energized by the energization of the said second switch-operating electromagnet.

27. A speed-alarm system for an automobile or other vehicle having a speed-controlling member and including in combination: a first rotary control-member; a second rotary control-member; first drive-means operatively connected to the said first rotary control-member and constructed and arranged to drive the same at at least one substantially-constant speed; second drive-means operatively interconnecting the said second rotary control-member with a variable-speed portion of a vehicle and causing the said variable-speed portion to drive the said second control-member; speed-changing means constructed and arranged to selectively alter the speed at which one of the said drive-means drives the control-member to which it is connected; first switch-means; translating-means jointly controlled by both of the said first control-member and second control-member and in turn translating the movements thereof into operation of the said first switch-means; a source of electrical energy; a first switch-operating electromagnet; a second switch-means controlled by the said first switch-operating electromagnet; third switch-means controlled by the movement of the said speed-controlling member of the vehicle; a first energizing circuit for the said first switch-operating electromagnet and including the said source of electrical energy, the said first switch-means and the said third switch-means, the said first energizing circuit being arranged to be rendered effective to initially energize the said first switch-operating electromagnet by the actuation of the said first switch-means under control of the said translating-means and when the said speed-controlling member is in its operational position; time-delay apparatus including fourth switch-means; a second energizing circuit for the said time-delay apparatus and including the said source of electrical energy and the said first switch-means, the said second energizing circuit being arranged to be rendered effective to initially energize the said time-delay apparatus by the actuation of the said first switch-means under control of the said translating-means; a first locking-circuit including the said source of electrical energy, the said second switch-means and the said third switch-means, the said first locking-circuit being arranged to be rendered effective by the operation of the said second switch-means to continue the energization of the said first switch-operating electromagnet and thereby continue the energization of the said time-delay apparatus subsequent to the initial energization thereof; a second switch-operating electromagnet; fifth switch-means and sixth switch-means controlled by the said second switch-operating electromagnet; a third energizing circuit for the said second switch-operating electromagnet and including the said source of electrical energy and the said fourth switch-means, the said third energizing circuit being arranged to be rendered effective after a predetermined time-interval by operation of the fourth switch-means of the said time-delay apparatus to thereby initially energize the said second switch-operating electromagnet; a manually-operable switch-means; a second locking-circuit for the said second switch-operating electromagnet and including the said source of electrical energy, the said fifth switch-means and the said manually-operable switch-means, the said second locking-circuit being arranged to be rendered effective by the operation of the said fifth switch-means to continue the energization of the said second switch-operating electromagnet subsequent to the initial energization thereof; signal-means; and a fourth energizing circuit for the said signal-means and including the said source of electrical energy and the said sixth switch-means, the said fourth energizing circuit being arranged to be rendered effective by operation of the said sixth switch-means to thereby energize the said signal-means.

28. A speed-alarm system for an automobile or other vehicle having a speed-controlling member and including in combination: a first rotary control-member; a second rotary control-member; first drive-means operatively connected to the said first rotary control-member and constructed and arranged to drive the same at at least one substantially-constant speed; second drive-means operatively interconnecting the said second rotary control-member with a variable-speed portion of the vehicle and causing the said variable-speed portion to drive the said second control-member; speed-changing means constructed and arranged to selectively alter the speed at which one of the said drive-means drives the control-member to which it is connected; first switch-means; translating-means jointly controlled by both of the said first control-member and second control-member and in turn translating the movements thereof into operation of the said first switch-means; a source of electrical energy; a first switch-operating electromagnet; second switch-means controlled by the said first switch-operating electromagnet; third switch-means controlled by the movement of the said speed-controlling member of the vehicle; a first energizing circuit for the said first switch-operating electromagnet and including the said source of electrical energy, the said first switch-means and the said third switch-means, the said first energizing circuit being arranged to be rendered effective to initially energize the said first switch-operating electromagnet by the actuation of the said first switch-means under control of the said translating-means and when the said speed-controlling member is in its operational position; time-delay apparatus including fourth switch-means; a second energizing circuit for the said time-delay apparatus and including the said source of electrical energy and the said first switch-means, the said second energizing circuit being arranged to be rendered effective to initially energize the said time-delay apparatus by the actuation of the said first switch-means under control of the said translating-means; a first locking-circuit including the said source of electrical energy, the said second switch-means and the said third switch-means, the said first locking-circuit being arranged to be rendered effective by the operation of the said second switch-means to continue the energization of the said first switch-operating electromagnet and thereby continue the energization of the said time-delay apparatus subsequent to the initial energization thereof; a second switch-operating electromagnet; fifth switch-means controlled by the said second switch-operating electromagnet; a third energizing circuit for the said second switch-operating electromagnet and including the said source of electrical energy and the said fourth switch-means, the said third energizing circuit being arranged to be rendered effective after a predetermined time interval by operation of the fourth switch-means of the said time-delay apparatus to thereby initially energize the said second switch-operating electromagnet; sixth switch-means constructed and arranged to be manually operated; a second locking-circuit for the said second switch-operating electromagnet and including the said source of electrical energy, the said fifth switch-means and the said sixth switch-means, the said second locking-circuit being arranged to be rendered effective by the operation of the said fifth switch-means to continue the energization of the said second switch-operating electromagnet subsequent to the initial energization thereof; seventh switch-means controlled by the said translating-means; a third switch-operating electromagnet; eighth switch-means and ninth switch-means controlled by the said third switch-operating electromagnet; signal-means; a fourth energizing circuit for the said signal-means and including the said source of electrical energy, the said fourth switch-means and the said eighth switch-means, the said fourth energizing circuit being arranged to be rendered effective by operation of the said fourth switch-means to initially energize the said signal-means, energization of the said signal-means being continued subsequent to the initial energization thereof through the said fifth switch-means, the said sixth switch-means and the said eighth switch-means; tenth switch-means constructed and arranged to be manually operated; a fifth energizing circuit for the said third switch-operating electromagnet and including the said source of electrical energy, the said sixth switch-means, the said seventh switch-means and the said tenth switch-means, the said fifth energizing circuit being arranged to be rendered effective by manual operation of the said tenth switch-means to initially energize the said third switch-operating electromagnet thereby effecting the operation of the said eighth switch-means and the said ninth switch-means, the operation of the said eighth switch-means effecting the deenergization of the said signal-means; a third locking-circuit for the said third switch-operating electromagnet and including the said source of electrical energy, the said sixth switch-means, the said seventh switch-means and the said ninth switch-means, the said third locking-circuit being arranged to be rendered effective by the operation of the said ninth switch-means to continue the energization of the said third switch-operating electromagnet subsequent to restoration of the said tenth switch-means to its nonoperated position.

29. A speed-alarm system for an automobile or other vehicle having a speed-controlling member and including in combination: a first rotary control-member; a second rotary control-member; first drive-means operatively connected to the said first rotary control-member and constructed and arranged to drive the same at at least one substantially-constant speed; second drive-means constructed and arranged to drive the said second rotary control-member and including a differential-mechanism, the said differential-mechanism having a first drive gear-unit operatively connected to the running-gear of the vehicle and driven thereby, a second drive gear-unit operatively connected to the engine of the vehicle and driven thereby, and a driven gear-unit, the three said gear-units being constructed and arranged to cause the two said drive gear-units to respectively urge the said driven gear-unit in opposite directions; speed-changing means constructed and arranged to selectively alter the speed at which one of the said drive-means drives the control-member to which it is connected; first switch-means; translating-means jointly controlled by both of the said first control-member and second control-member and in turn translating the movements thereof into operation of the said first switch-means; a source of electrical energy; a first switch-operating electromagnet; second switch-means controlled by the said first switch-operating electromagnet; third switch-means controlled by the movement of the said speed-controlling member of the vehicle; a first energizing circuit for the said first switch-operating electromagnet and including the said source of electrical energy, the said first switch-means and the said third switch-means, the said first energizing circuit being arranged to be rendered effective to initially energize the said first switch-operating electromagnet by the actuation of the said first switch-means under control of the said translating-means and when the said speed-controlling member is in its operating position; time-delay apparatus including fourth switch-means; a second energizing circuit for the said time-delay apparatus and including the said source of electrical energy and the said first switch-means, the said second energizing circuit being arranged to be rendered effective to initially energize the said time-delay apparatus by the actuation of the said first switch-means under control of the said translating-means; a first locking-circuit including the said source of electrical energy, the said second switch-means and the said third switch-means, the said first locking-circuit being arranged to be rendered effective by the operation of the said second switch-means to continue the energization of the said first switch-operating electromagnet and thereby continue the energization of the said time-delay apparatus subsequent to the initial energization thereof; a second switch-operating electromagnet; fifth switch-means controlled by the said second switch-operating electromagnet; a third energizing circuit for the said second switch-operating electromagnet and including the said source of electrical energy and the said fourth switch-means, the said third energizing circuit being arranged to be rendered effective after a predetermined time interval by operation of the fourth switch-means of the said time-delay apparatus to thereby initially energize the said second switch-operating electromagnet; sixth switch-means constructed and arranged to be manually operated; a second locking-circuit for the said second switch-operating electromagnet and including the said source of electrical energy, the said fifth switch-means and the said sixth switch-means, the said second locking-circuit being arranged to be rendered effective by the operation of the said fifth switch-means to continue the energization of the said second switch-operating electromagnet subsequent to the initial energization thereof; seventh switch-means controlled by the said translating-means; a third switch-operating electromagnet; eighth switch-means and ninth switch-means controlled by the said third switch-operating electromagnet; signal-means; a fourth energizing circuit for the said signal-means and including the said source of electrical energy, the said fourth switch-means and the said eighth switch-means, the said fourth energizing circuit being arranged to be rendered effective by operation of the said fourth switch-means to initially energize the said signal-means, energization of the said signal-means being continued subsequent to the initial energization thereof through the said fifth switch-means, the said sixth switch-means and the said eighth switch-means; tenth switch-means constructed and arranged to be manually operated; a fifth energizing circuit for the said third switch-operating electromagnet and including the said source of electrical energy, the said sixth switch-means, the said seventh switch-means and the said tenth switch-means, the said fifth energizing circuit being arranged to be rendered effective by manual operation of the said tenth switch-means to initially energize the said third switch-operating electromagnet thereby effecting the operation of the said eighth switch-means and the said ninth switch-means, the operation of the said eighth switch-means effecting the deenergization of the said signal-means; a third locking-circuit for the said third switch-operating electromagnet and including the said source of electrical energy, the said sixth switch-means, the said seventh switch-means and the said ninth switch-means, the said third locking-circuit being arranged to be rendered effective by the operation of the said ninth switch-means to continue the energization of the said third switch-operating electromagnet subsequent to restoration of the said tenth switch-means to its nonoperated position.

30. A speed-alarm system for an automobile or other vehicle having a speed-controlling member and including in combination: a first rotary control-member; a second rotary control-member; first drive-means operatively connected to the said first rotary control-member and constructed and arranged to drive the same at at least one substantially-constant speed; second drive-means operatively interconnecting the said second rotary control-member with a variable-speed portion of the vehicle and causing the said variable-speed portion to drive the said second control-member; speed-changing means constructed and arranged to selectively alter the speed at which one of the said drive-means drives the control-member to which it is connected; first switch-means; translating-means jointly controlled by both of the said first control-member and second control-member and in turn translating the movements thereof into operation of the said first switch-means; a source of electrical energy; a first switch-operating electromagnet; second switch-means controlled by the said first switch-operating electromagnet; third switch-means controlled by the movement of the said speed-controlling member of the vehicle; a first energizing circuit for the said first switch-operating electromagnet and including the said source of electrical energy, the said first switch-means and the said third switch-means, the said first energizing circuit being arranged to be rendered effective to initially energize the said first switch-operating electromagnet by the actuation of the said first switch-means under control of the said translating-means and when the said speed-controlling member is in its operational position; time-delay apparatus including fourth switch-means; a second energizing circuit for the said time-delay apparatus and including the said source of electrical energy and the said first switch-means, the said second energizing circuit being arranged to be rendered effective to initially energize the said time-delay apparatus by the actuation of the said first switch-means under control of the said translating-means; a first locking-circuit including the said source of electrical energy, the said second switch-means and the said third switch-means, the said first locking-circuit being arranged to be rendered effective by the operation of the said second switch-means to continue the energization of the said first switch-operating electromagnet and thereby continue the energization of the said time-delay apparatus subsequent to the initial energization thereof; a second switch-operating electromagnet; fifth switch-means and sixth switch-means controlled by the said second switch-operating electromagnet; a third energizing circuit for the said second switch-operating electromagnet and including the said source of electrical energy and the said fourth switch-means, the said third energizing circuit being arranged to be rendered effective after a predetermined time interval by operation of the fourth switch-means of the said time-delay apparatus to thereby initially energize the said second switch-operating electromagnet; seventh switch-means constructed and arranged to be manually operated; a second locking-circuit for the said second switch-operating electromagnet and including the said source of electrical energy, the said first switch-means and the said seventh switch-means, the said second locking-circuit being arranged to be rendered effective by the operation of the said fifth switch-means to continue the energization of the said second switch-operating electromagnet subsequent to the initial energization thereof; eighth switch-means controlled by the said translating-means; a third switch-operating electromagnet; ninth switch-means and tenth switch-means controlled by the said third switch-operating electromagnet; signal-means; a fourth energizing circuit for the said signal-means and including the said source of electrical energy, the said sixth switch-means and the said ninth switch-means, the said fourth energizing circuit being arranged to be rendered effective by operation of the said sixth switch-means to thereby energize the said signal-means; eleventh switch-means constructed and arranged to be manually operated; a fifth energizing circuit for the said third switch-operating electromagnet and including the said source of electrical energy, the said seventh switch-means, the said eighth switch-means and the said eleventh switch-means, the said fifth energizing circuit being arranged to be rendered effective by manual operation of the said eleventh switch-means to initially energize the said third switch-operating electromagnet thereby effecting the operation of the said ninth switch-means and the said tenth switch-means, the operation of the said ninth switch-means effecting the deenergization of the said signal-means; a third locking-circuit for the said third switch-operating electromagnet and including the said source of electrical energy, the said seventh switch-means, the said eighth switch-means and the said tenth switch-means, the said third locking-circuit being arranged to be rendered effective by the operation of said tenth switch-means to continue the energization of the said third switch-operating electromagnet subsequent to restoration of the said eleventh switch-means to its nonoperated position.

31. A speed-alarm system for an automobile or other vehicle having a speed-controlling member and including in combination: a first rotary control-member; a second rotary control-member; first drive-means operatively connected to the said first rotary control-member and constructed and arranged to drive the same at at least one substantially-constant speed; second drive-means constructed and arranged to drive the said second rotary control-member and including a differential-mechanism, the said differential-mechanism having a first drive gear-unit operatively connected to the running-gear of the vehicle and driven thereby, a second drive gear-unit operatively connected to the engine of the vehicle and driven thereby, and a driven gear-unit, the three said gear-units being constructed and arranged to cause the two said drive gear-units to respectively urge the said driven gear-unit in opposite directions; speed-changing means constructed and arranged to selectively alter the speed at which one of the said drive-means drives the control-member to which it is connected; first switch-means; translating-means jointly controlled by both of the said first control-member and second control-member and in turn translating the movements thereof into operation of the said first switch-means; a source of electrical energy; a first switch-operating electromagnet; second switch-means controlled by the said first switch-operating electromagnet; third switch-means controlled by the movement of the said speed-controlling member of the vehicle; a first energizing circuit for the said first switch-operating electromagnet and including the said source of electrical energy, the said first switch-means and the said third switch-means, the said first energizing circuit being arranged to be rendered effective to initially energize the said first switch-operating electromagnet by the actuation of the said first switch-means under control of the said translating-means and when the said speed-controlling member is in its operational position; time-delay apparatus including fourth switch-means; a second energizing circuit for the said time-delay apparatus and including the said source of electrical energy and the said first switch-means, the said second energizing circuit being arranged to be rendered effective to initially energize the said time-delay apparatus by the actuation of the said first switch-means under control of the said translating-means; a first locking-circuit including the said source of electrical energy, the said second switch-means and the said third switch-means, the said first locking-circuit being arranged to be rendered effective by the operation of the said second switch-means to continue the energization of the said first switch-operating electromagnet and thereby continue the energization of the said time-delay apparatus subsequent to the initial energization thereof; a second switch-operating electromagnet; fifth switch-means and sixth switch-means controlled by the said second switch-operating electromagnet; a third energizing circuit for the said second switch-operating electromagnet and including the said source of electrical energy and the said fourth switch-means, the said third energizing circuit being arranged to be rendered effective after a predetermined time interval by operation of the fourth switch-means of the said time-delay apparatus to thereby initially energize the said second switch-operating electromagnet; seventh switch-means constructed and arranged to be manually operated; a second locking-circuit for the said second switch-operating electromagnet and including the said source of electrical energy, the said fifth switch-means and the said seventh switch-means, the said second locking-circuit being arranged to be rendered effective by the operation of the said fifth switch-means to continue the energization of the said second switch-operating electromagnet subsequent to the initial energization thereof; eighth switch-means controlled by the said translating-means; a third switch-operating electromagnet; ninth switch-means and tenth switch-means controlled by the said third switch-operating electromagnet; signal-means; a fourth energizing circuit for the said signal-means and including the said source of electrical energy, the said sixth switch-means and the said ninth switch-means, the said fourth energizing circuit being arranged to be rendered effective by operation of the said sixth switch-means to thereby energize the said signal-means; eleventh switch-means constructed and arranged to be manually operated; a fifth energizing circuit for the said third switch-operating electromagnet and including the said source of electrical energy, the said seventh switch-means, the said eighth switch-means and the said eleventh switch-means, the said fifth energizing circuit being arranged to be rendered effective by manual operation of the said eleventh switch-means to initially energize the said third switch-operating electromagnet thereby effecting the operation of the said ninth switch-means and the said tenth switch-means, the operation of the said ninth switch-means effecting the deenergization of the said signal-means; a third locking-circuit for the said third switch-operating electromagnet and including the said source of electrical energy, the said seventh switch-means, the said eighth switch-means and the said tenth switch-means, the said third locking-circuit being arranged to be rendered effective by the operation of the said tenth switch-means to continue the energization of the said third switch-operating electromagnet subsequent to restoration of the said eleventh switch-means to its nonoperated position.

HENRY SPICER DAVIS.

REFERENCES CITED

The following references are of record in the file of this patent:

UNITED STATES PATENTS

| Number | Name | Date |
|---|---|---|
| 706,554 | Hall | Aug. 12, 1902 |
| 2,446,870 | Davis | Aug. 10, 1948 |
| 2,446,871 | Davis | Aug. 10, 1948 |